(12) United States Patent
Alspach et al.

(10) Patent No.: US 11,577,395 B2
(45) Date of Patent: Feb. 14, 2023

(54) SYSTEMS FOR DETERMINING LOCATION USING ROBOTS WITH DEFORMABLE SENSORS

(71) Applicants: Toyota Research Institute, Inc., Los Altos, CA (US); TOYOTA JIDOSHA KABUSHIKI KAISHA, Toyota (JP)

(72) Inventors: Alexander Alspach, Somerville, MA (US); Naveen Suresh Kuppuswamy, Arlington, MA (US); Avinash Uttamchandani, Cambridge, MA (US); Samson F. Creasey, Cambridge, MA (US); Russell L. Tedrake, Needham, MA (US); Kunimatsu Hashimoto, Brookline, MA (US); Erik C. Sobel, Newton, MA (US); Takuya Ikeda, Nagakute (JP)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 305 days.

(21) Appl. No.: 16/931,626

(22) Filed: Jul. 17, 2020

(65) Prior Publication Data

US 2021/0252709 A1 Aug. 19, 2021

Related U.S. Application Data

(60) Provisional application No. 62/984,083, filed on Mar. 2, 2020, provisional application No. 62/977,466, filed on Feb. 17, 2020.

(51) Int. Cl.
*B25J 13/08* (2006.01)
*B25J 9/16* (2006.01)
(Continued)

(52) U.S. Cl.
CPC .......... *B25J 9/1674* (2013.01); *B25J 9/0009* (2013.01); *B25J 9/161* (2013.01); *B25J 9/1664* (2013.01);
(Continued)

(58) Field of Classification Search
CPC ........ B25J 9/1674; B25J 9/161; B25J 9/0009; B25J 9/1664; B25J 11/0085; B25J 13/089; B25J 13/085
(Continued)

(56) References Cited

U.S. PATENT DOCUMENTS 7,263,412 B2 8/2007 Gutmann et al.
7,620,477 B2 11/2009 Bruemmer
(Continued)

FOREIGN PATENT DOCUMENTS

DE 102016108460 A1 11/2017

OTHER PUBLICATIONS

Long Xianchao "Tactile-Based Mobile Robot Navigation" May 30, 2013 (May 30, 2013), XP055818996, Retrieved from the Internet: URL:https://web.wpi.edu/Pubs/ETD/Available/etd-061313-134710/unrestricted/xlong. pdf [retrieved on Jun. 29, 2021], 73 pages.
(Continued)

*Primary Examiner* — Dalena Tran
(74) *Attorney, Agent, or Firm* — Dinsmore & Shohl LLP

(57) ABSTRACT

Systems and methods for determining a location of a robot are provided. A method includes receiving, by a processor, a signal from a deformable sensor including data with respect to a deformation region in a deformable membrane of the deformable sensor resulting from contact with a first object. The data associated with contact with the first object is compared, by the processor, to details associated with contact with the first object to information associated with a plurality of objects stored in a database. The first object is
(Continued)

identified, by the processor, as a first identified object of the plurality of objects stored in the database. The first identified object is an object of the plurality of objects stored in the database that is most similar to the first object. The location of the robot is determined, by the processor, based on a location of the first identified object.

20 Claims, 15 Drawing Sheets

(51) Int. Cl.
*B25J 9/00* (2006.01)
*B25J 11/00* (2006.01)

(52) U.S. Cl.
CPC .......... *B25J 13/085* (2013.01); *B25J 13/089* (2013.01); *B25J 9/1697* (2013.01); *B25J 11/0085* (2013.01)

(58) Field of Classification Search
USPC ................ 700/258, 259, 255; 901/1, 33, 46
See application file for complete search history.

(56) References Cited

U.S. PATENT DOCUMENTS

| | | |
|---|---|---|
| 8,286,509 B2 | 10/2012 | Igarashi et al. |
| 9,981,382 B1 | 5/2018 | Strauss et al. |
| 10,197,399 B2 | 2/2019 | Wirbel et al. |
| 11,372,416 B2* | 6/2022 | Shalev-Shwartz ............................ B60W 30/0956 |
| 11,373,134 B2* | 6/2022 | Kumar .................... G06Q 50/30 |
| 2016/0267344 A1* | 9/2016 | Yamamoto .............. G06F 1/163 |
| 2019/0035099 A1* | 1/2019 | Ebrahimi Afrouzi .. G06N 3/008 |
| 2019/0091871 A1 | 3/2019 | Alspach et al. |
| 2019/0094869 A1 | 3/2019 | Artes et al. |
| 2019/0346333 A1 | 11/2019 | Youceftoumi et al. |
| 2020/0005020 A1* | 1/2020 | Meany .................. G06F 16/284 |

OTHER PUBLICATIONS

Yussof H et al: "Application of Contact-Based Sensors for Self-Localization and Object Recognition in Humanoid Robot Navigation Tasks", Robot and Human Interactive Communication, 2007. RO-MAN 2007. The 16th IEEE International Symposium on, IEEE, PI, Aug. 26, 2007 (Aug. 26, 2007), pp. 188-193, XP031224912, ISBN: 978-1-4244-1634-9, 6 pages.

Extended European Search Report for Application No. 21157621. 0-1202, date Jul. 12, 2021, 8 pages.

D. Hristu, N.J. Ferrier, R.W. Brocket, The Performance of a Deformable-Membrane Tactile Sensor:Basic Results on Geometrically-Defined Tasks (https://apps.dtic.mil/dtic/tr/fulltext/u2/a439988. pdf), subm. to ICRA 2000, 8 pages.

Alex Alspach1, Kunimatsu Hashimoto1, Naveen Kuppuswamy1, and Russ TedrakeSoft-bubble: A highly compliant dense geometry tactile sensor for robot manipulation (https://arxiv.org/ftp/arxivpapers/ 1904/1904.02252.pdf), published/accessed Feb. 18, 2019, 8 pages.

\* cited by examiner

SYSTEMS FOR DETERMINING LOCATION USING ROBOTS WITH DEFORMABLE SENSORS

CROSS-REFERENCE TO RELATED APPLICATION

This application claims priority to U.S. Provisional Patent Application No. 62/977,466, filed Feb. 17, 2020, for "Systems For Determining Location Using Robots With Bubble Sensors," and U.S. Provisional Patent Application No. 62/984,083, filed on Mar. 2, 2020, for "Bubble Sensor Grippers For Robust Manipulation And Manipuland State Estimation," which are hereby incorporated by reference in their entirety including the drawings.

TECHNICAL FIELD

Embodiments described herein generally relate to systems and methods for determining a location of a robot within a space and, more particularly, robots having deformable contact and geometry/pose sensors capable of detecting contact and a geometry of an object to determine a location of the robot.

BACKGROUND

As humans, our sense of touch allows us to determine the shape of an object without looking at the object. This assists us in identifying the object and, without using our sense of sight, we may be able to ascertain where we are located within a space based on our knowledge of the location of the objected touched.

Robots are commonly equipped with end effectors that are configured to perform certain tasks. However, robots do not have varying levels of touch sensitivity as do humans. End effectors may include sensors such as pressure sensors, but such sensors provide limited information about the object that is in contact with the end effector. Thus, the robot may damage a target object by using too much force, or drop the object because it does not properly grasp the object. As such, in some applications, a deformable/compliant end effector may be desirable.

However, robots are currently not capable of contacting an object in this manner and, as a result, the robots are not capable of identifying the object. Therefore, to determine a position or location of the robot, robots rely on other technology, such as GPS sensors or visual sensors, to identify the location of the robot. However, these may turn out to be inaccurate in small-scale environments.

SUMMARY

In one embodiment, a method for determining a location of a robot including a deformable sensor includes receiving, by a processor, a signal from a deformable sensor including data with respect to a deformation region in a deformable membrane of the deformable sensor resulting from contact with a first object. The data associated with contact with the first object is compared, by the processor, to details associated with contact with the first object to information associated with a plurality of objects stored in a database. The first object is identified, by the processor, as a first identified object of the plurality of objects stored in the database. The first identified object is an object of the plurality of objects stored in the database that is most similar to the first object. The location of the robot is determined, by the processor, based on a location of the first identified object.

In another embodiment, a robot for determining a location within a space includes a casing including an upper surface, an opposite lower surface, and an edge surface extending between the upper surface and the lower surface. At least one deformable sensor is provided on the casing. The at least one deformable sensor includes an internal sensor and a deformable membrane. The internal sensor is configured to output a deformation region with the deformable membrane as a result of contact with a first object. The robot includes one or more processors and one or more memory modules including a computer-readable medium storing computer-readable instructions that, when executed by the one or more processors, cause the one or more processors to receive data from the internal sensor representing the deformation region when the first object is contacted. The data associated with contact of the first object is compared by the processor to details associated with a plurality of objects stored in a database. The first identified object is an object of the plurality of objects stored in the database that is most similar to the first object. The processor identifies the first object as a first identified object of the plurality of objects stored in the database. A location of the robot is determined by the processor based on a location of the first identified object.

In yet another embodiment, a system for determining a location of a robot including a deformable sensor includes a robot including an upper surface, an opposite lower surface, and an edge surface extending between the upper surface and the lower surface. At least one deformable sensor is provided on the robot. The at least one deformable sensor includes a housing, a deformable membrane coupled to an upper portion of the housing, an enclosure configured to be filled with a medium, and an internal sensor disposed within the enclosure having a field of view configured to be directed through the medium and toward a bottom surface of the deformable membrane. The internal sensor is configured to output a deformation region within the deformable membrane as a result of contact with a first object. The system includes one or more processors and one or more memory modules including a computer-readable medium storing computer-readable instructions that, when executed by the one or more processors, cause the one or more processors to receive data from the internal sensor representing the deformation region when the first object is contacted. The data associated with contact of the first object is compared by the processor to details associated with a plurality of objects stored in a database. The first identified object is an object of the plurality of objects stored in the database that is most similar to the first object. The processor identifies the first object as a first identified object of the plurality of objects stored in the database. A location of the robot is determined by the processor based on a location of the first identified object.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to robots including deformable sensors and, more particularly, deformable/compliant contact and/or geometry sensors (hereinafter "deformable sensors") that not only detect contact with a target object, but also detect the geometry, pose, and contact force of the target object to identify a location of the robots. Particularly, the deformable sensors described herein comprise a deformable membrane coupled to a housing that maintains a sensor capable of detecting displacement of the deformable membrane by contact with an object. Thus, the deformable sensors described herein provide a robot (or other device) with a sense of touch when manipulating or contacting objects.

Autonomous robots are used for accomplishing various tasks and may efficiently navigate a space, such as a building or an individual room. Such tasks may include retrieving an item, delivering an item, or, in the case of an autonomous vacuum, cleaning a room. Known autonomous vacuums map a space, such as a room of a house, by driving in straight directions until an object, such as a wall, step, or other obstacle is contacted, and the robot stores the location information of the contacted object in its memory as an object to be avoided during future cleaning operations. As additional objects are contacted, the robot continually adds location information of these objects to its memory to more accurately map the room and avoid these objects in the future.

Figure 1:
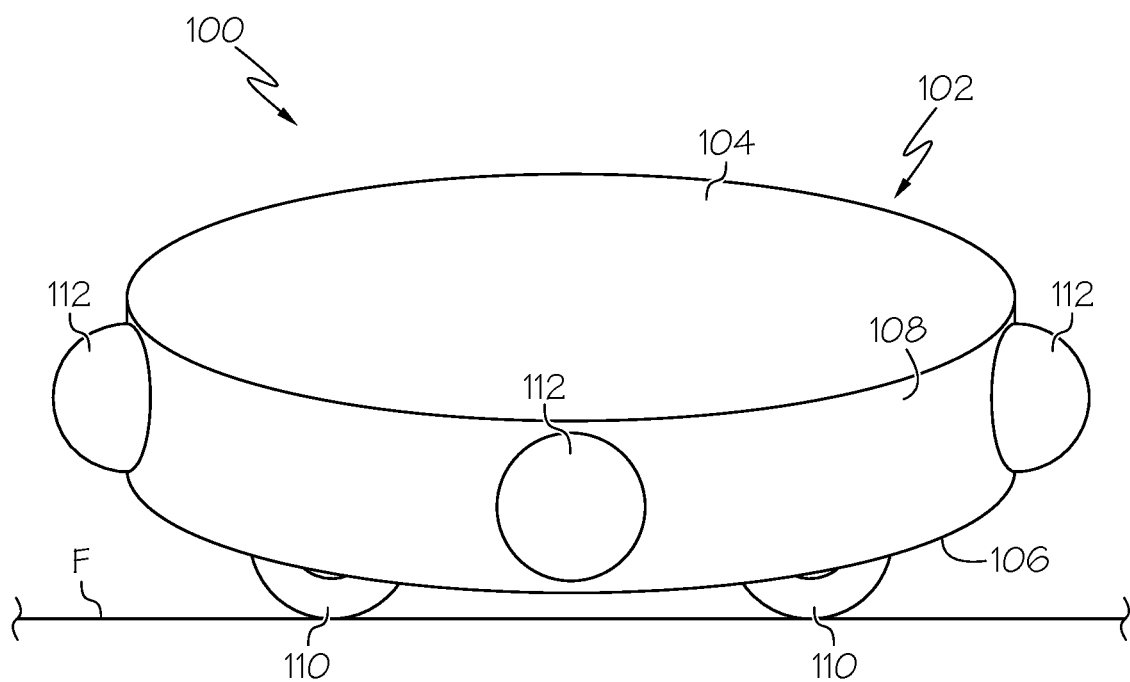
FIG. 1 schematically depicts a perspective view of an example robot including a plurality of deformable sensors according to one or more embodiments described and illustrated herein.

As shown in FIG. 1, an example robot 100 is illustrated as an autonomous vacuum and the robot operation referred to herein is a cleaning operation. However, it should be appreciated that the robot 100 may be any other suitable robot other than an autonomous vacuum for performing other tasks without departing from the scope of the present disclosure. For example, the robot 100 may be an object retrieval or delivery robot instructed to navigate a space between a starting point and a destination point.

The robot 100 generally includes a casing 102 defined by an upper surface 104, an opposite lower surface 106, and an edge surface 108 extending between the upper surface 104 and the lower surface 106. The casing 102 houses the internal components of the robot 100, described herein. The lower surface 106 of the casing 102 faces a downward direction toward a floor surface F and the upper surface 104 faces in an opposite upward direction. It should be understood that embodiments are not limited to the casing 102 configuration of FIG. 1, and the various surfaces may take on other shapes. At least one wheel 110 is provided on the lower surface 106 of the casing 102 to permit the robot 100 to traverse the floor surface F. In some embodiments, the robot 100 includes a pair of wheels 110. In other embodiments, the robot 100 may include legs including joints, skis, rails, or flying components for moving or transporting the robot 100.

Further, the robot 100 includes at least one deformable sensor 112 provided on the edge surface 108 of the casing 102. In some embodiments, the robot 100 includes a plurality of deformable sensors 112 spaced apart from one another along the edge surface 108 of the casing 102. In embodiments in which a plurality of deformable sensors 112 are provided, the plurality of deformable sensors 112 may be spaced apart and arranged along the edge surface 108 of the casing 102 in any suitable manner. However, in some embodiments, the deformable sensors 112 may be located on the upper surface 104 and/or the lower surface 106 of the casing 102. When the deformable sensors 112 are located on the lower surface 106 of the casing 102, the deformable sensors 112 may be suitable for sensing the type of floor the robot 100 is rolling over, the height a threshold, or the like. In other embodiments, the robot 100 may include any number of arms including joints with an end effector attached to an end of the arm. In this embodiment, the deformable sensors 112 may be provided on the end effector and independently movable with respect to the robot 100.

The deformable sensors 112 provided on the robot 100 may be any suitable deformable sensors, such as those embodiments discussed herein, capable of identifying characteristics, such as geometry, pose, hardness, flexibility, and the like, of an object contacted. The ensuing description of the robot 100 will refer to the deformable sensors 112 generally with regard to their use in identifying an object and assisting the robot 100 in determining its location.

Figure 2:
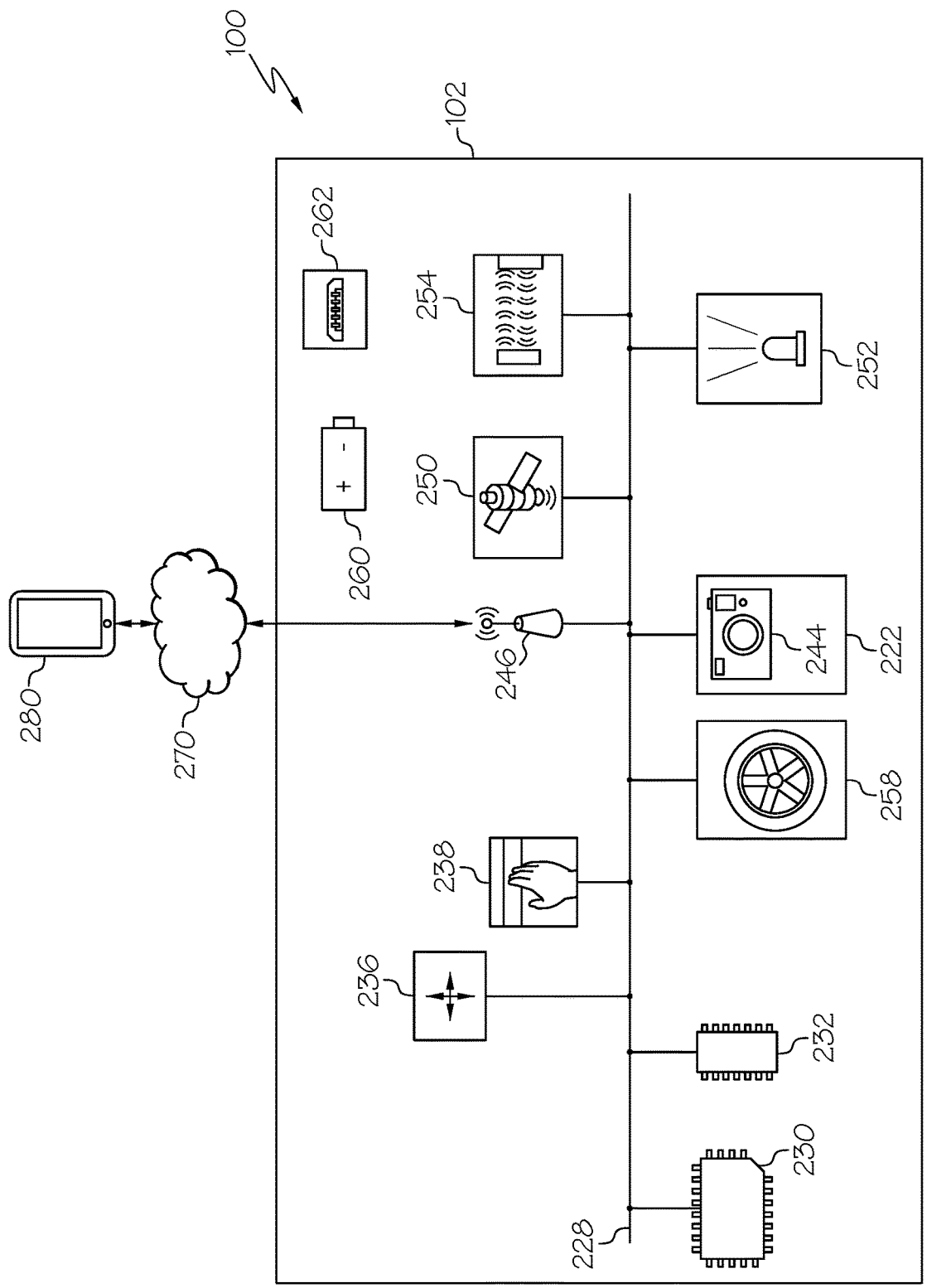
FIG. 2 is a block diagram illustrating hardware utilized by the robot of FIG. 1 for implementing various processes and systems according one or more embodiments described and illustrated herein.

Referring now to FIG. 2, example components of one non-limiting embodiment of the robot 100 is schematically depicted. In some embodiments, the robot 100 includes a communication path 228, a processor 230, a memory module 232, an inertial measurement unit 236, an input device 238, a camera 244, network interface hardware 246, a location sensor 250, a light 252, a proximity sensor 254, a motorized wheel assembly 258, a battery 260, and a charging port 262. The components of the robot 100 may be contained within or mounted to the casing 102. The various components of the robot 100 and the interaction thereof will be described in detail below.

Still referring to FIG. 2, the communication path 228 may be formed from any medium that is capable of transmitting a signal such as, for example, conductive wires, conductive traces, optical waveguides, or the like. Moreover, the communication path 228 may be formed from a combination of mediums capable of transmitting signals. In one embodiment, the communication path 228 comprises a combination of conductive traces, conductive wires, connectors, and buses that cooperate to permit the transmission of electrical data signals to components such as processors, memories, sensors, input devices, output devices, and communication devices. Accordingly, the communication path 228 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 228 communicatively couples the various components of the robot 100. As used herein, the term "communicatively coupled" means that coupled components are capable of exchanging data signals with one another such as, for example, electrical signals via conductive medium, electromagnetic signals via air, optical signals via optical waveguides, and the like.

The processor 230 of the robot 100 may be any device capable of executing computer-readable instructions. Accordingly, the processor 230 may be a controller, an integrated circuit, a microchip, a computer, or any other computing device. The processor 230 may be communicatively coupled to the other components of the robot 100 by the communication path 228. This may, in various embodiments, allow the processor 230 to receive data from the one or more deformable sensors 112. In other embodiments, the processor 230 may receive data directly from one or more internal sensors, which are part of one or more deformable sensors 112 on a robot 100. Accordingly, the communication path 228 may communicatively couple any number of processors with one another, and allow the components coupled to the communication path 228 to operate in a distributed computing environment. Specifically, each of the components may operate as a node that may send and/or receive data. While the embodiment depicted in FIG. 2 includes a single processor 230, other embodiments may include more than one processor.

Still referring to FIG. 2, the memory module 232 of the robot 100 is coupled to the communication path 228 and communicatively coupled to the processor 230. The memory module 232 may, for example, contain computer-readable instructions to detect a shape of an object that has deformed the deformable sensors 112. In this example, these instructions stored in the memory module 232, when executed by the processor 230, may allow for the determination of the shape of an object based on the observed deformation of the deformable sensors 112. The memory module 232 may comprise RAM, ROM, flash memories, hard drives, or any non-transitory memory device capable of storing computer-readable instructions such that the computer-readable instructions can be accessed and executed by the processor 230. The computer-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into computer-readable instructions and stored in the memory module 232. Alternatively, the computer-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single memory module 232, other embodiments may include more than one memory module.

The inertial measurement unit 236, if provided, is coupled to the communication path 228 and communicatively coupled to the processor 230. The inertial measurement unit 236 may include one or more accelerometers and one or more gyroscopes. The inertial measurement unit 236 transforms sensed physical movement of the robot 100 into a signal indicative of an orientation, a rotation, a velocity, or an acceleration of the robot 100. The operation of the robot 100 may depend on an orientation of the robot 100 (e.g., whether the robot 100 is horizontal, tilted, or the like). Some embodiments of the robot 100 may not include the inertial measurement unit 236, such as embodiments that include an accelerometer but not a gyroscope, embodiments that include a gyroscope but not an accelerometer, or embodiments that include neither an accelerometer nor a gyroscope.

One or more input devices 238 are coupled to the communication path 228 and communicatively coupled to the processor 230. The input device 238 may be any device capable of transforming user contact into a data signal that can be transmitted over the communication path 228 such as, for example, a button, a switch, a knob, a microphone or the like. In various embodiments, an input device 238 may be the deformable sensor 112 as described herein. In some embodiments, the input device 238 includes a power button, a volume button, an activation button, a scroll button, or the like. The one or more input devices 238 may be provided so that the user may interact with the robot 100, such as to navigate menus, make selections, set preferences, and other functionality described herein. In some embodiments, the input device 238 includes a pressure sensor, a touch-sensitive region, a pressure strip, or the like. It should be understood that some embodiments may not include the input device 238. As described in more detail below, embodiments of the robot 100 may include multiple input devices disposed on any surface of the casing 102. In some embodiments, one or more of the input devices 238 are configured as a fingerprint sensor for unlocking the robot 100. For example, only a user with a registered fingerprint may unlock and use the robot 100.

The camera 244 is coupled to the communication path 228 and communicatively coupled to the processor 230. The camera 244 may be any device having an array of sensing devices (e.g., pixels) capable of detecting radiation in an ultraviolet wavelength band, a visible light wavelength band, or an infrared wavelength band. The camera 244 may have any resolution. The camera 244 may be an omni-directional camera, or a panoramic camera. In some embodiments, one or more optical components, such as a mirror, fish-eye lens, or any other type of lens may be optically coupled to the camera 244. As described in more detail below, the camera 244 is a component of an imaging assembly 222 operable to be raised above the casing 102 to capture image data.

The network interface hardware 246 is coupled to the communication path 228 and communicatively coupled to the processor 230. The network interface hardware 246 may be any device capable of transmitting and/or receiving data via a network 270. Accordingly, network interface hardware 246 can include a wireless communication module configured as a communication transceiver for sending and/or receiving any wired or wireless communication. For example, the network interface hardware 246 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 246 includes hardware configured to operate in accordance with the Bluetooth wireless communication protocol. In another embodiment, network interface hardware 246 may include a Bluetooth send/receive module for sending and receiving Bluetooth communications to/from a portable electronic device 280. The network interface hardware 246 may also include a radio frequency identification ("RFID") reader configured to interrogate and read RFID tags.

In some embodiments, the robot 100 may be communicatively coupled to a portable electronic device 280 via the network 270. In some embodiments, the network 270 is a personal area network that utilizes Bluetooth technology to communicatively couple the robot 100 and the portable electronic device 280. In other embodiments, the network 270 may include one or more computer networks (e.g., a personal area network, a local area network, or a wide area network), cellular networks, satellite networks and/or a global positioning system and combinations thereof. Accordingly, the robot 100 can be communicatively coupled to the network 270 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

As stated above, the network 270 may be utilized to communicatively couple the robot 100 with the portable electronic device 280. The portable electronic device 280 may include a mobile phone, a smartphone, a personal digital assistant, a camera, a dedicated mobile media player, a mobile personal computer, a laptop computer, and/or any other portable electronic device capable of being communicatively coupled with the robot 100. The portable electronic device 280 may include one or more processors and one or more memories. The one or more processors can execute logic to communicate with the robot 100. The portable electronic device 280 may be configured with wired and/or wireless communication functionality for communicating with the robot 100. In some embodiments, the portable electronic device 280 may perform one or more elements of the functionality described herein, such as in embodiments in which the functionality described herein is distributed between the robot 100 and the portable electronic device 280.

The location sensor 250 is coupled to the communication path 228 and communicatively coupled to the processor 230. The location sensor 250 may be any device capable of generating an output indicative of a location. In some embodiments, the location sensor 250 includes a global positioning system (GPS) sensor, though embodiments are not limited thereto. Some embodiments may not include the location sensor 250, such as embodiments in which the robot 100 does not determine a location of the robot 100 or embodiments in which the location is determined in other ways (e.g., based on information received from the camera 244, the network interface hardware 246, the proximity sensor 254, the inertial measurement unit 236 or the like). The location sensor 250 may also be configured as a wireless signal sensor capable of triangulating a location of the robot 100 and the user by way of wireless signals received from one or more wireless signal antennas.

The motorized wheel assembly 258 is coupled to the communication path 228 and communicatively coupled to the processor 230. As described in more detail below, the motorized wheel assembly 258 includes the at least one wheel 110 driven by one or more motors (not shown). The processor 230 may provide one or more drive signals to the motorized wheel assembly 258 to actuate the wheels 110 such that the robot 100 travels to a desired location, such as a location that the user wishes to acquire environmental information (e.g., the location of particular objects within at or near the desired location).

The light 252, if provided, is coupled to the communication path 228 and communicatively coupled to the processor 230. The light 252 may be any device capable of outputting light, such as, but not limited to, a light emitting diode, an incandescent light, a fluorescent light, or the like. Some embodiments include a power indicator light that is illuminated when the robot 100 is powered on. Some embodiments include an activity indicator light that is illuminated when the robot 100 is active or processing data. Some embodiments include an illumination light for illuminating the environment in which the robot 100 is located. Some embodiments may not include the light 252.

The proximity sensor 254, if provided, is coupled to the communication path 228 and communicatively coupled to the processor 230. The proximity sensor 254 may be any device capable of outputting a proximity signal indicative of a proximity of the robot 100 to another object. In some embodiments, the proximity sensor 254 may include a laser scanner, a capacitive displacement sensor, a Doppler effect sensor, an eddy-current sensor, an ultrasonic sensor, a magnetic sensor, an internal sensor, a radar sensor, a LiDAR sensor, a sonar sensor, or the like. Some embodiments may not include the proximity sensor 254, such as embodiments in which the proximity of the robot 100 to an object is determined from inputs provided by other sensors (e.g., the camera 244, etc.) or embodiments that do not determine a proximity of the robot 100 to an object.

The robot 100 may be powered by the battery 260, which is electrically coupled to the various electrical components of the robot 100. The battery 260 may be any device capable of storing electric energy for later use by the robot 100. In some embodiments, the battery 260 is a rechargeable battery, such as a lithium-ion battery or a nickel-cadmium battery. In embodiments in which the battery 260 is a rechargeable battery, the robot 100 may include the charging port 262, which may be used to charge the battery 260. Some embodiments may not include the battery 260, such as embodiments in which the robot 100 is powered the electrical grid, by solar energy, or by energy harvested from the environment. Some embodiments may not include the charging port 262, such as embodiments in which the robot 100 utilizes disposable batteries for power.

Figure 3:
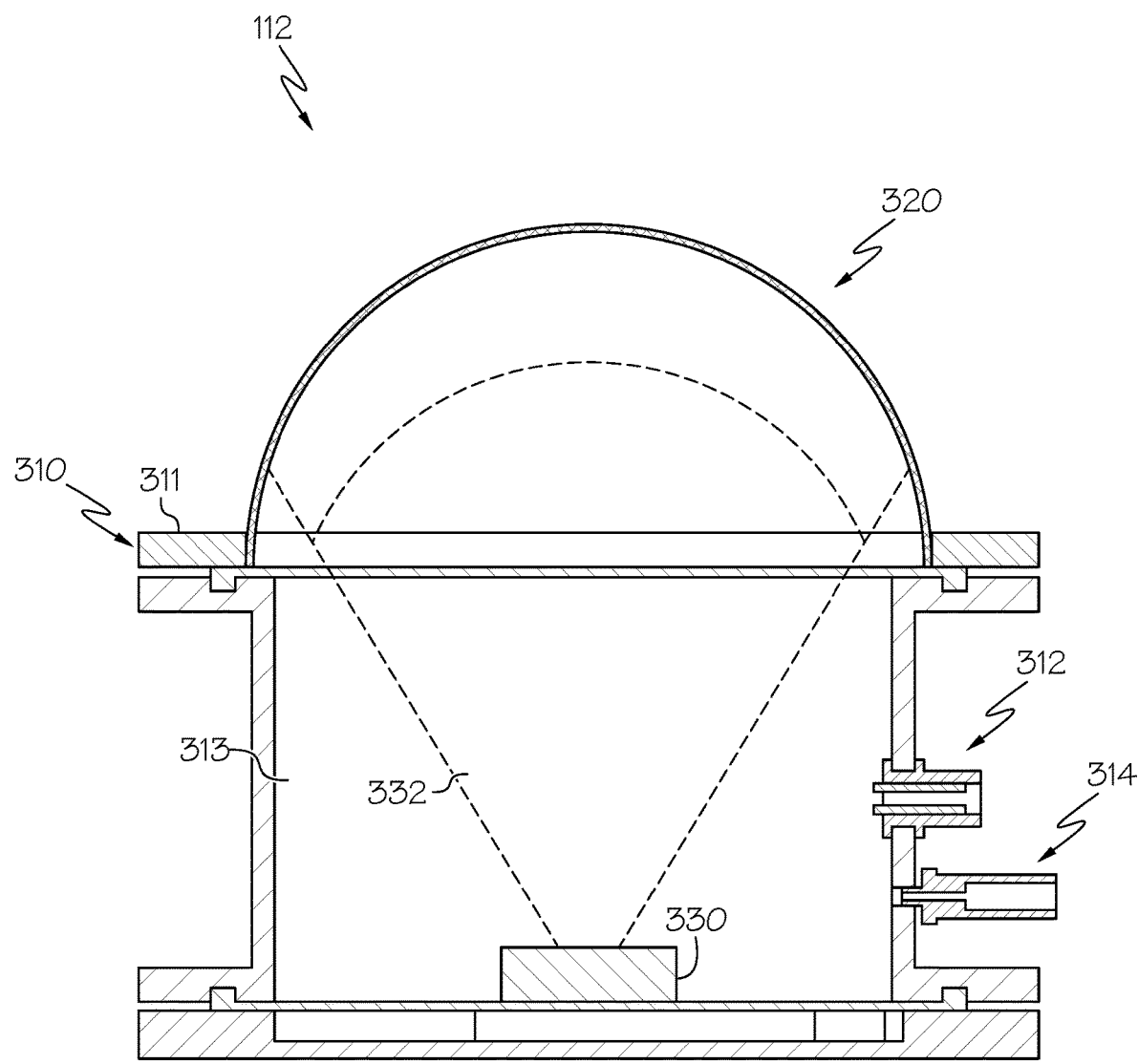
FIG. 3 schematically depicts a cross-sectional view of an example deformable sensor according to one or more embodiments described and illustrated herein.
Figure 4:
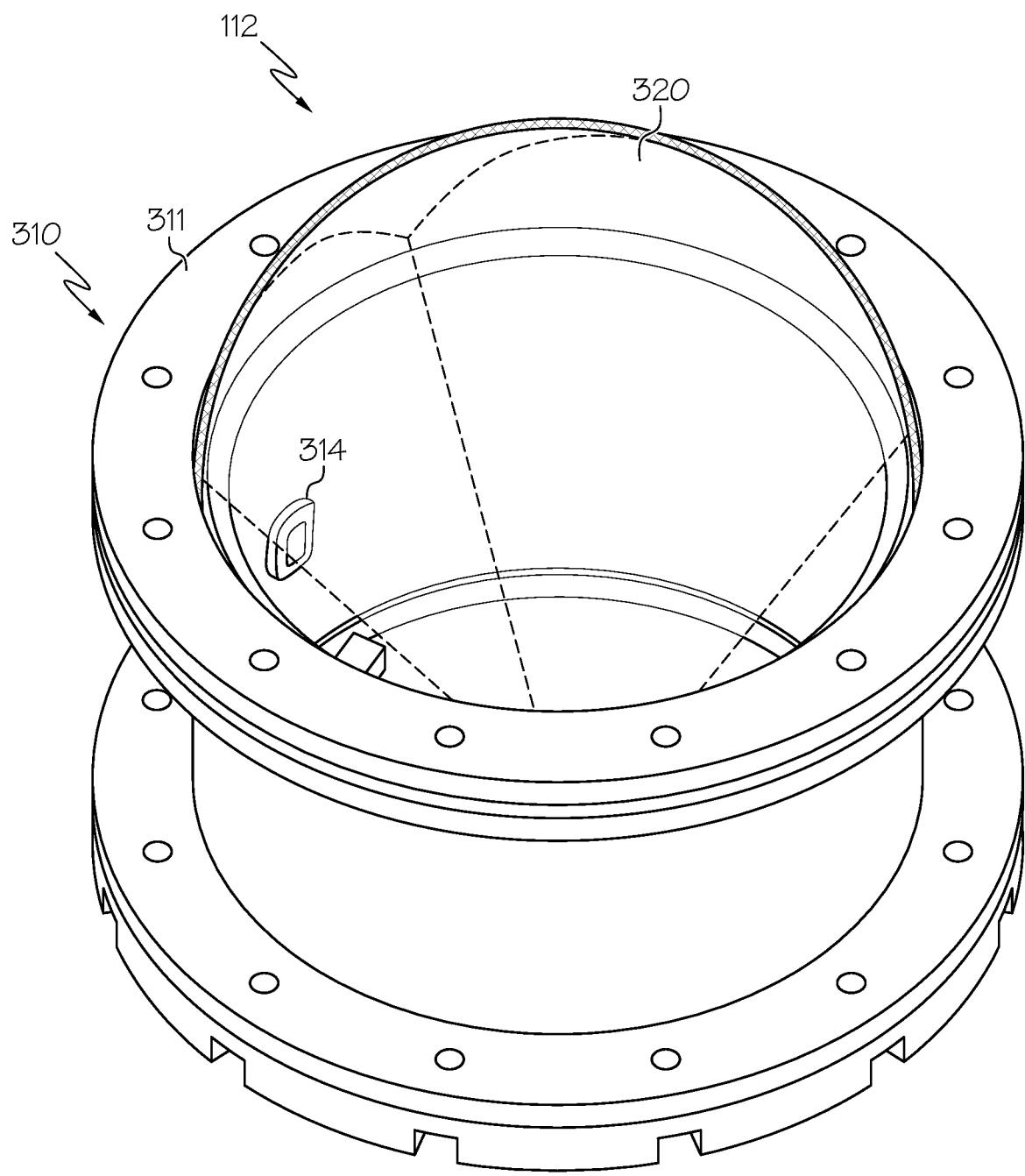
FIG. 4 schematically depicts a top perspective view of the example deformable sensor of FIG. 3 according to one or more embodiments described and illustrated herein.

Referring now to FIGS. 3 and 4, an embodiment of the deformable sensor 112, of the robot 100 is schematically illustrated. FIG. 3 is a cross-sectional view of the example deformable sensor 112 and FIG. 4 is a top perspective view of the example deformable sensor 112. The example deformable sensor 112 generally comprises a housing 310 and a deformable membrane 320 coupled to the housing 310, such as by an upper portion 311 of the housing 310. In some embodiments, the housing 310 is 3D printed. The housing 310 and the deformable membrane 320 define an enclosure 313 that is filled with a medium through one or more fluid conduits 312, which may be a valve or any other suitable mechanism. The fluid conduit 312 may be utilized to fill or empty the enclosure 313. In one example, the medium is gas, such as air. Thus, air may be pumped into the enclosure 313 to a desired pressure such that the deformable membrane 320 forms a dome shape as shown in FIGS. 3 and 4, although any suitable shape may be utilized in other embodiments. In another example, the medium is a gel, such as silicone or other rubber-like substance. In some embodiments, a substance such as solid silicone may be cast in a given shape before assembly of the deformable sensor 112. In various embodiments, the medium may be anything that is transparent to an internal sensor 330, discussed in more detail herein, such as to a wavelength of a time-of-flight sensor. The medium may include clear/transparent rubbers in some embodiments. In other embodiments, the medium may be a liquid. In some examples, the deformable membrane 320 and the medium within the enclosure 313 may be fabricated of the same material, such as, without limitation, silicone. In some embodiments, the deformable sensor 112 may be mountable. For example, the enclosure 313 may include brackets to be mounted any suitable object, such as the robot 100 or material. The deformable membrane 320 may be a latex or any other suitable material, such as a suitably thin, non-porous, rubber-like material. In some embodiments, the deformable membrane 320 is laser-cut from a 0.04 mm thick latex sheet.

As used herein, the term "deformability" may refer, for example, to ease of deformation of a deformable sensor. Deformability may refer to how easily a deformable membrane deforms when contacting a target object. The deformability of the deformable sensor 112 may be tuned/modified by changing the material of the deformable membrane 320 and/or the pressure within the enclosure 313. By using a softer material (e.g., soft silicone), the deformable sensor 112 may be more easily deformed. Similarly, lowering the pressure within the enclosure 313 may also cause the deformable membrane 320 to more easily deform, which may in turn provide for a more deformable sensor 112. In some embodiments, the deformable membrane 320 is inflated to a height of 20 mm to 75 mm and to a pressure of 0.20 psi to 0.30 psi.

As used herein, the term "spatial resolution" may refer, for example, to how many pixels a deformable sensor has. The number of pixels may range from 1 (e.g., a sensor that simply detects contact with a target object) to thousands or millions (e.g., the dense sensor provided by a time-of-flight sensor having thousands of pixels) or any suitable number. The deformable sensor 112 may be of a high spatial resolution, with a dense tactile sensing sensor that is provided as an end effector of the robot 100, thereby giving the robot 100 a fine sense of touch like a human's fingers. The deformable sensor 112 may also have a depth resolution to measure movement toward and away from the sensor. In some embodiments, the deformable sensor 112 features varying touch sensitivity due to varying spatial resolution and/or depth resolution.

An internal sensor 330 capable of sensing depth may be disposed within the enclosure 313, which may be measured by the depth resolution of the internal sensor 330. The internal sensor 330 may have a field of view 332 directed through the medium and toward a bottom surface of the deformable membrane 320. In some embodiments, the field of view 332 of the internal sensor 330 is 62°×45°+/−10%. In some embodiments, the internal sensor 330 may be an optical sensor. As described in more detail below, the internal sensor 330 may be capable of detecting deflections of the deformable membrane 320 when the deformable membrane 320 comes into contact with an object. In one example, the internal sensor 330 is a time-of-flight sensor capable of measuring depth. The time-of-flight sensor emits an optical signal (e.g., an infrared signal) and has individual detectors (i.e., "pixels") that detect how long it takes for the reflected signal to return to the sensor. The time-of-flight sensor may have any desired spatial resolution. The greater the number of pixels, the greater the spatial resolution. The spatial resolution of the sensor disposed within the internal sensor 330 may be changed. In some cases, low spatial resolution (e.g., one "pixel" that detects a single point's displacement) may be desired. In others, a sensitive time-of-flight sensor such may be used as a high spatial resolution internal sensor 330 that provides dense tactile sensing. Thus, the internal sensor 330 may be modular because the sensors may be changed depending on the application. A non-limiting example of a time-of-flight sensor is the Pico Flexx sold by PMD Technologies AG of Siegen, Germany. Other types of visual internal sensors include, by way of non-limiting example, stereo cameras, laser range sensors, structured light sensors/3D scanners, single cameras (such as with dots or other patterns inside), or any other suitable type of visual detector. For example, the internal sensor 330 may be configured as a stereo-camera capable of detecting deflections of the deformable membrane 320 by an object.

Any suitable quantity and/or types of internal sensors 330 may be utilized within a single deformable sensor 112 in some embodiments. In some examples, not all internal sensors 330 within a deformable sensor 112 need be of the same type. In various embodiments, one deformable sensor 112 may utilize a single internal sensor 330 with a high spatial resolution, whereas another deformable sensor 112 may use a plurality of internal sensors 330 that each have a low spatial resolution. In some embodiments, the spatial resolution of a deformable sensor 112 may be increased due to an increase in the quantity of internal sensors 330. In some examples, a decrease in the number of internal sensors 330 within a deformable sensor 112 can be compensated for by a corresponding increase in the spatial resolution of at least some of the remaining internal sensors 330. As discussed in more detail below, the aggregate deformation resolution may be measured as a function of the deformation resolution or depth resolution among the deformable sensors 112 in a portion of the robot 100. In some embodiments, aggregate deformation resolution may be based upon a quantity of deformable sensors 112 in a portion of the robot 100 and a deformation resolution obtained from each deformable sensor 112 in that portion.

Referring again to FIG. 3, a power conduit 314 may be utilized in the enclosure 313 to provide power and/or data/signals, such as to the internal sensor 330 by way of a cable, such as for USB (universal serial bus) or any other suitable type of power and/or signal/data connection. As used herein, an airtight conduit may include any type of passageway through which air or any other fluid (such as liquid) cannot pass. In this example, the power conduit 314 is airtight and may provide a passageway through which solid object (such as wires/cables) may pass through with an airtight seal, such as an O-ring, being formed around such wires/cables at each end of the power conduit 314. Other embodiments utilize wireless internal sensors 330 to transmit and/or receive data and/or power. In various embodiments where the medium is not a gas, such as silicone, the enclosure 313 and/or power conduit 314 may not necessarily be airtight.

In some embodiments, the internal sensor 330 may include one or more internal pressure sensors (barometers, pressure sensors, etc., or any combination thereof) utilized to detect the general deformation of the deformable membrane 320 through the medium. In some embodiments, the deformable sensor 112 and/or internal sensor 330 may receive/send various data, such as through the power conduit 314 discussed above, wireless data transmission (Wi-Fi, Bluetooth, etc.), or any other suitable data communication protocol. For example, pressure within a deformable sensor 112 may be specified by a pressurization parameter and may be inversely proportional to the deformability of the deformable sensor 112. In some embodiments, the deformability of a deformable sensor 112 may be modified by changing pressure within the enclosure 313 or a material of the deformable membrane 320. In some embodiments, receipt of an updated parameter value may result in a real-time or delayed update (pressurization, etc.).

Figure 5:
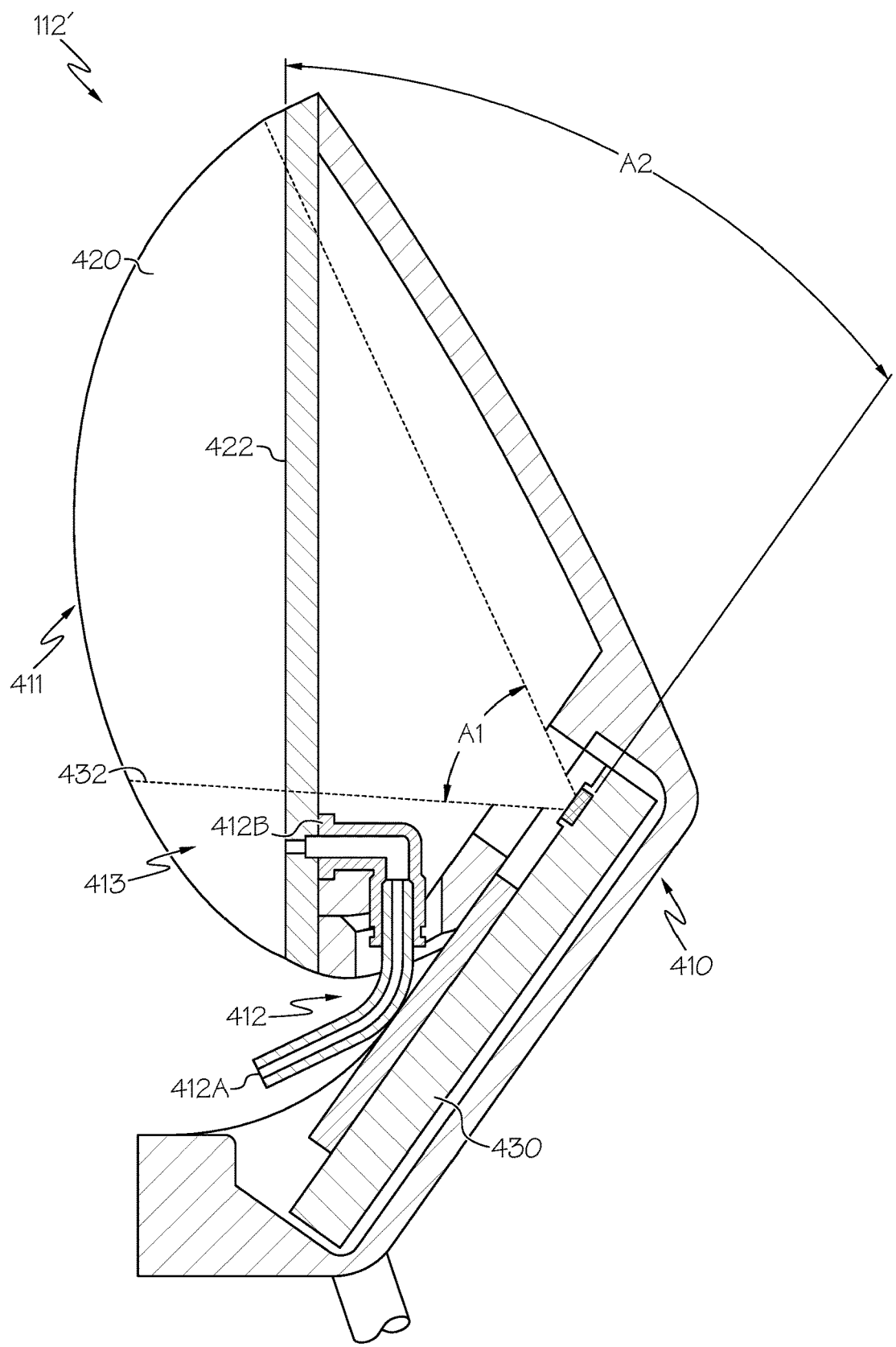
FIG. 5 schematically depicts a cross-sectional view of an example deformable sensor according to one or more embodiments described and illustrated herein.
Figure 6:
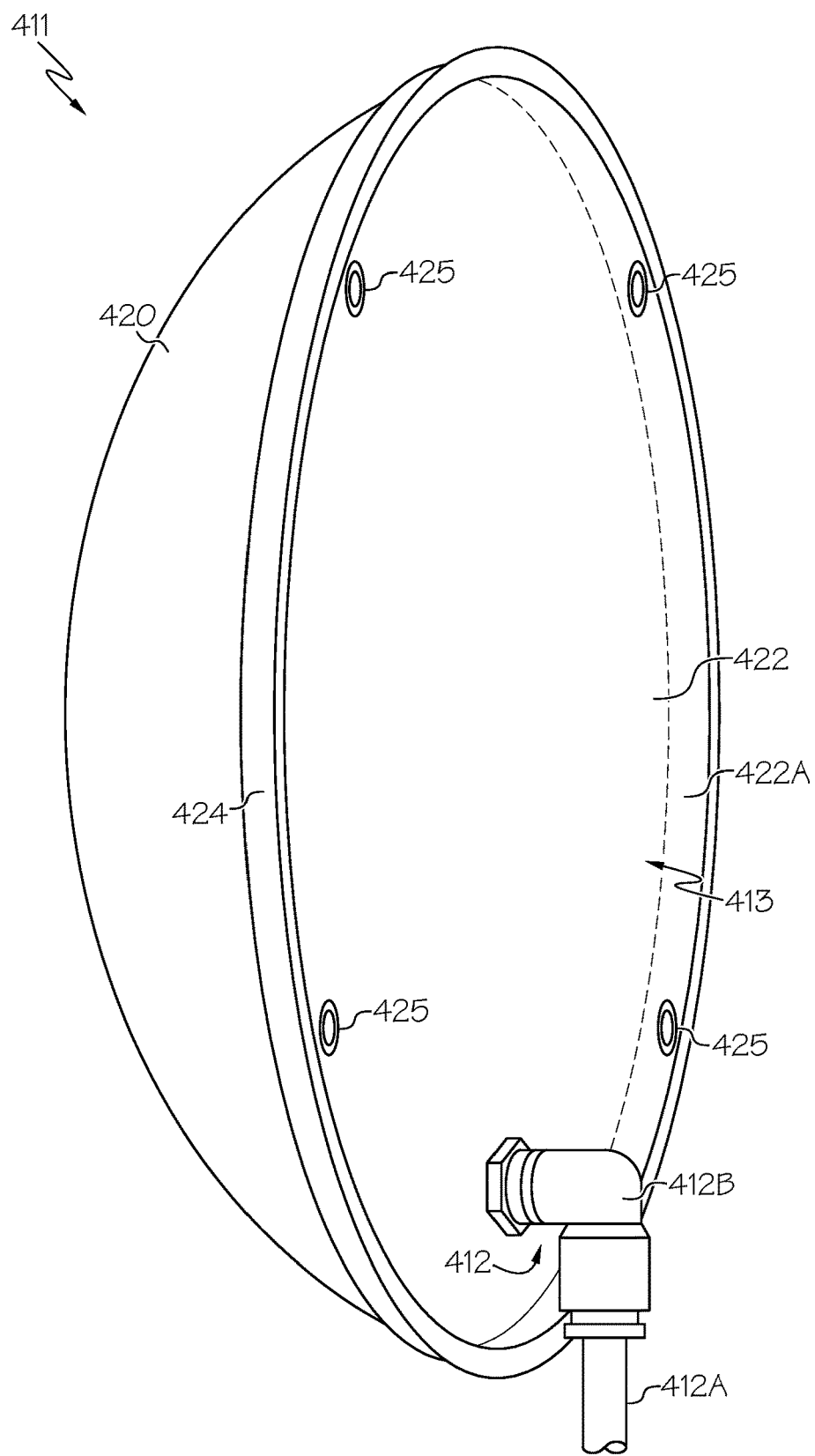
FIG. 6 schematically depicts a rear perspective view of a bubble module of the example deformable sensor of FIG. 5 according to one or more embodiments described and illustrated herein.
Figure 7:
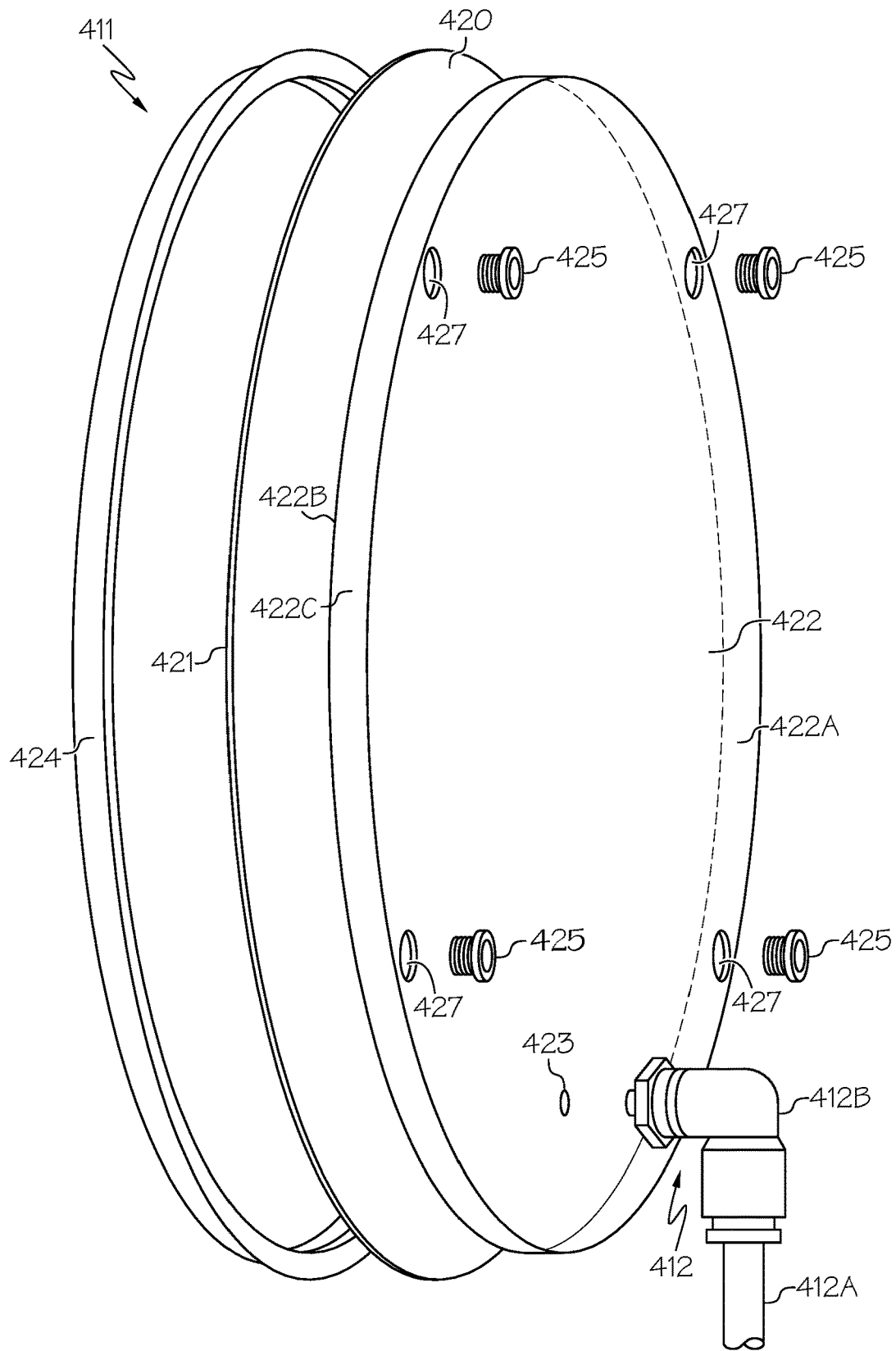
FIG. 7 schematically depicts an exploded view of the bubble sensor of FIG. 6 according to one or more embodiments described and illustrated herein.

Referring now to FIGS. 5-7, another example deformable sensor 112' is schematically illustrated. FIG. 5 depicts a cross-sectional view of the deformable sensor 112'. The deformable sensor 112' is similar to the deformable sensor 112 illustrated in FIGS. 3 and 4, and generally comprises a housing 410 and a bubble module 411 coupled to the housing 410. The bubble module 411 includes a deformable membrane 420, similar to deformable membrane 320 shown in FIGS. 3 and 4. As such, the deformable membrane 420 may include any of the features disclosed herein with respect to the deformable membrane 320. The bubble module 411 of the deformable sensor 112' is similar to the upper portion 311 of the deformable sensor 112 shown in FIGS. 3 and 4. However, the bubble module 411 is removable from the housing 410 and, thus, replaceable when necessary. The bubble module 411 defines an enclosure 413 that is filled with a medium through one or more fluid conduits 412, which may be a valve or any other suitable mechanism, extending through the housing 410 and terminating at the bubble module 411. As shown, the fluid conduit 412 includes a tube 412A and a tube fitting 412B. The fluid conduit 412 may be utilized to fill or empty the enclosure 413. As the enclosure 413 is filled with the medium, the deformable membrane 420 forms a dome shape, as shown in FIGS. 5 and 6.

An internal sensor 430, similar to the internal sensor 330, capable of sensing depth may be disposed within the housing 410, which may be measured by the depth resolution of the internal sensor 430. The internal sensor 430 may have a field of view 432, having an angle A1, directed through the medium and toward a bottom surface of the deformable membrane 420. As a non-limiting example, the angle A1 of the field of view 432 of the internal sensor 430 is 62°× 45°+/−10%. In some embodiments, the internal sensor 430 may be an optical sensor. As described in more detail below, the internal sensor 430 may be capable of detecting deflections of the deformable membrane 420 when the deformable membrane 420 comes into contact with an object. In one example, the internal sensor 430 is a time-of-flight sensor capable of measuring depth. The time-of-flight sensor emits an optical signal (e.g., an infrared signal) and has individual detectors (i.e., "pixels") that detect how long it takes for the reflected signal to return to the sensor.

As shown in FIG. 5, the internal sensor 430 is provided within the housing 410 and oriented at an angle A2 with respect to the bubble module 411 and the deformable membrane 420. Specifically, the internal sensor 430 extends along an axis with the angle A2 extending between the axis of the internal sensor 430 and a backing plate 422 of the bubble module 411, discussed in more detail herein. As a non-limiting example, the angle A2 between the internal sensor 430 and the bubble module 411 may be 35°+/−10%. The internal sensor 430 being angled maximizes the field of view 432 and depth measurement accuracy at a center and distal edge of the deformable membrane 420 opposite the internal sensor 430, while minimizing an overall width dimension of the deformable sensor 112'.

Referring now to FIGS. 6 and 7, the bubble module 411 of the deformable sensor 112' is shown apart from the housing 410. As shown in FIG. 6, the bubble module 411 is shown in its assembled form, while FIG. 7 illustrates an exploded view of the bubble module 411. The bubble module 411 includes the deformable membrane 420, the backing plate 422, and a ring 424 for securing the deformable membrane 420 onto the backing plate 422. The bubble module 411 may be removably coupled to the housing 410 using any suitable means, such as threaded inserts 425 extending through holes 427 in the backing plate 422 for securing the backing plate 422 to the housing 410. Alternatively, or in addition thereto, the threaded inserts 425 may be used to further secure an outer edge 421 of the deformable membrane 420 to the backing plate 422.

More particularly, the backing plate 422 includes a housing surface 422A, a membrane surface 422B, and an edge surface 422C extending between the housing surface 422A and the membrane surface 422B. The backing plate 422 is formed from a transparent material, such as an acrylic, so that the field of view 432 of the internal sensor 430 is not obstructed by the bubble module 411. In assembling the bubble module 411, an adhesive may be applied onto the edge surface 422C of the backing plate 422. Thereafter, the outer edge 421 of the deformable membrane 420 may be positioned around the backing plate 422 to contact the edge surface 422C thereof and be adhered thereto. Further, the ring 424 may be positioned around the edge surface 422C of the backing plate 422 in order to sandwich the deformable membrane 420 between the backing plate 422 and the ring 424. As noted above, the threaded inserts 425 may be used to further secure the deformable membrane 420 to the backing plate 422 by positioning the outer edge 421 of the deformable membrane 420 along the housing surface 422A of the backing plate 422 and inserting the threaded inserts 425 through the outer edge 421 of the deformable membrane 420 and the backing plate 422. As shown, the tube fitting 412B is shown attached to the backing plate 422 at an orifice 423 and the tube 412A extends from the tube fitting 412B to deliver a medium into the bubble module 411.

Thus, if the deformable sensor 112' is damaged, for example if the deformable membrane 420 punctured, such that medium leaks out of the bubble module 411, the deformable sensor 112' may be repaired without interfering with the housing 410 and electrical components provided therein, such as the internal sensor 430. In doing so, the bubble module 411 is removed from the housing 410 via the threaded inserts 425, or any other suitable means provided, and a replacement bubble module 411 may be coupled to the housing 410. Alternatively, it may be desirable to repair the existing bubble module 411 by replacing only the deformable membrane 420 or repairing the deformable membrane 420 itself by providing a patch to seal the puncture or other damaged area. It should appreciated that providing the deformable sensor 112' having the bubble module 411 that may be easily replaced allows for a greater portion of the deformable sensor 112' to be housed within the robot 100 while only the bubble module 411 is exposed and accessible from an exterior of the robot 100. This reduces the size of such the robot 100 and reduces the likelihood of damage to the deformable sensor 112' during operation.

Figure 8:
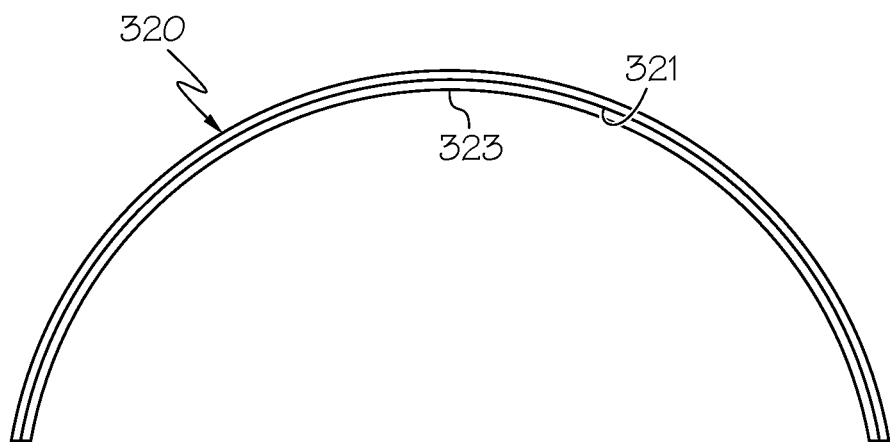
FIG. 8 schematically depicts a filter layer coupled to a deformable membrane of a deformable sensor according to one or more embodiments described and illustrated herein.

Referring now to FIG. 8, in some embodiments, the deformable sensors 112, 112' may include an optional filter layer 323. In a non-limiting example, the filter layer 323 is illustrated as being provided on the deformable sensor 112. The filter layer 323 may be disposed on a bottom surface 321 of the deformable membrane 320. As described in more detail herein, the bottom surface 321 of the deformable membrane 320 may be patterned (e.g., a dot pattern, a grid pattern, or any other suitable type pattern). By way of non-limiting example, a stereo-camera may be utilized to detect displacement of the deformable membrane 320 based on identified deformations of the patterned bottom surface 321. The filter layer 323 may be configured to aid the internal sensor 330 in detecting deformation of the deformable membrane 320. In some embodiments, the filter layer 323 reduces glare or improper reflections of one or more optical signals emitted by the internal sensor 330. In some embodiments, the filter layer 323 may scatter one or more optical signals emitted by the internal sensor 330. The filter layer 323 may be an additional layer secured to the bottom surface 321 of the deformable membrane 320, or it may be a coating and/or pattern applied to the bottom surface 321 of the deformable membrane 320.

Figure 9:
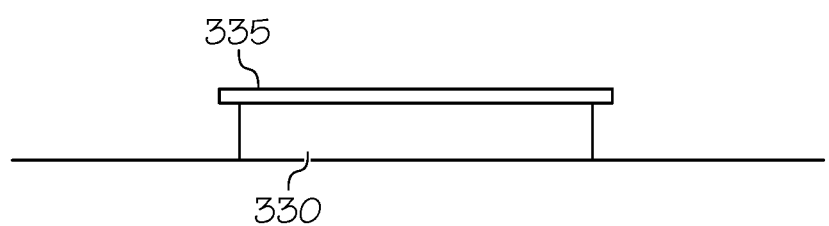
FIG. 9 schematically depicts a filter within a field of view of an internal sensor of a deformable sensor according to one or more embodiments described and illustrated herein.

Referring to FIG. 9, in some embodiments, the deformable sensors 112, 112' may include an internal sensor filter 335. In a non-limiting example, the internal sensor filter 335 is illustrated as being provided on the internal sensor 330 of the deformable sensor 112. The internal sensor filter 335 may be disposed within the field of view 332 of the internal sensor 330. The internal sensor filter 335 may optimize the optical signal emitted by the internal sensor 330 for reflection upon the bottom surface 321 of the deformable membrane 320. Like the filter layer 323, the internal sensor filter 335 may be disposed within a field of view 332 of the internal sensor 330 and may reduce glare or improper reflections of any optical signals emitted by the internal sensor 330. In some embodiments, the internal sensor filter 335 may scatter one or more optical signals emitted by the internal sensor 330. In some embodiments, both the filter layer 323 and the internal sensor filter 335 may be utilized.

Figure 10:
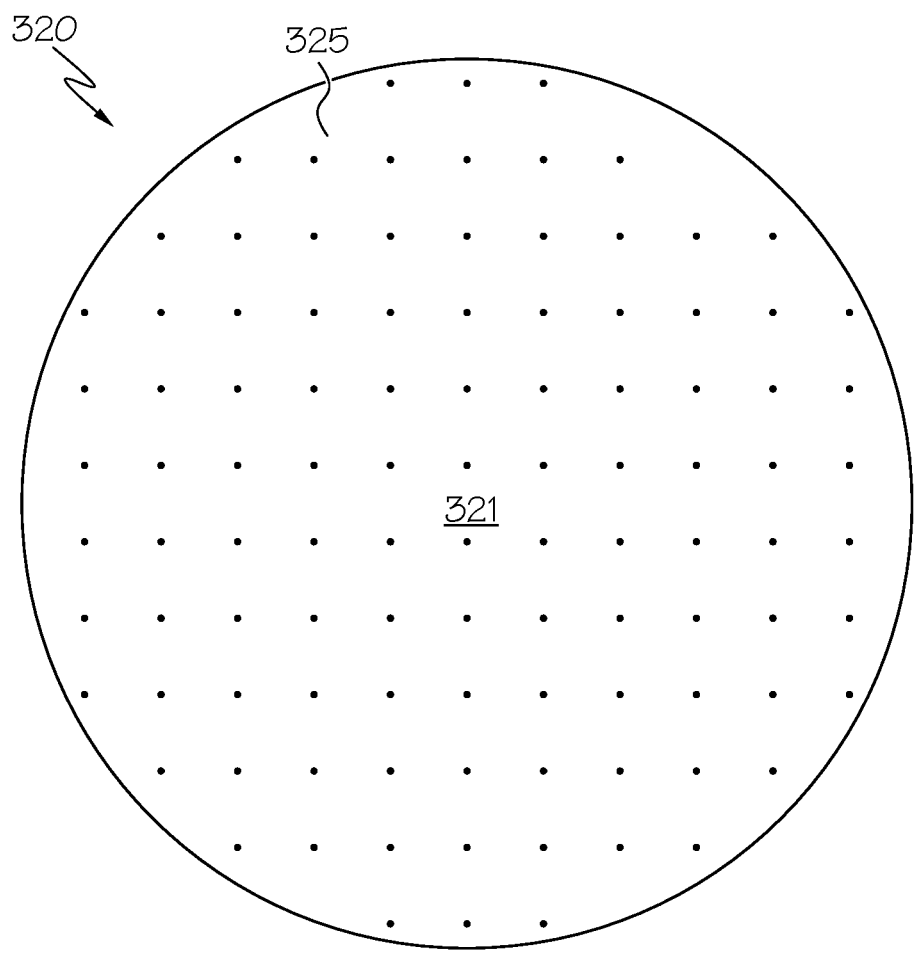
FIG. 10 schematically depicts a dot pattern on a bottom surface of a deformable membrane of a deformable sensor according to one or more embodiments described and illustrated herein.

A pattern may be provided on either the bottom surface of the deformable membrane 320 of the deformable sensor 112 or the bottom surface of the deformable membrane 420 of the deformable sensor 112'. Referring again to FIG. 10, in a non-limiting example, a dot pattern 325 including a plurality of arranged dots may be applied to the bottom surface 321 of the deformable membrane 320 on the optional filter layer 323 or the deformable membrane 320 itself to assist in the detection of the deformation of the deformable membrane 320. For example, the dot pattern 325 may assist in the detection of the deformation when the internal sensor 330 is a stereo-camera. Alternatively, a stereo-camera may be provided in addition to the internal sensor 330 to supplement the deformation detection of the internal sensor 330. Varying degrees of distortion to the dot pattern 325 may be utilized to discern how much deformation has occurred to the deformable membrane 320. The pattern on the bottom surface 321 may be random and not necessarily arranged in a dot pattern 325 or an array as shown in FIG. 10.

In some embodiments in which the dot pattern 325 is provided, an initial or pre-deformation image of the dot pattern 325 on the bottom surface 321 of the deformable membrane 320 may be captured prior to any deformation of the deformable membrane 320. Thereafter, the internal sensor 330, or separate stereo-camera, if provided, captures at least one post-deformation image of the dot pattern 325 during or after deformation of the deformable membrane 320. The pre-deformation image may be compared to the post-deformation image and the location of each dot in the pre-deformation image is compared to corresponding dots in the post-deformation image to determine an amount of displacement of the dots and, thus, the displacement of the deformation membrane 320. The displacement of each dot may be used to determine the amount of deformation at individual quadrants or sections of the dot pattern 325. The amount of displacement of each dot is then converted into a distance measurement to determine the specific deformation of the deformable membrane 320, or sections thereof, to discern a geometry and/or pose of the object deforming the deformable membrane 320.

In some embodiments, measurements between each dot, or at least some of the dots, of the dot pattern 325 may be stored within a memory module, such as memory module 232 (FIG. 2) of the deformable sensor 112 or an associated processor, such as processor 230 (FIG. 2). Thus, instead of merely determining a geometry and/or pose of the target object, the dimensions of various sections of the target object may be determined by calculating specific deformations between adjacent dots of the dot pattern 325. When the dot pattern 325 includes a greater number of dots, the dot pattern 325 may permit detection of deformation within smaller areas of the deformable membrane 320 as compared to when the dot pattern 325 includes a fewer number of dots. In embodiments in which the dots of the dot pattern 325 is arranged in an array, the dots may be equidistantly spaced apart from one another or arranged in any other suitable manner. However, in some embodiments, the distances between the dots when not equidistantly spaced from one another are stored within the memory module to identify the arrangement of the dots. In addition, it should be appreciated that the same technique discussed above of comparing the pre-deformation image to the post-deformation image may be repeated for a plurality of post-deformation images taken during deformation of the deformable membrane 320 to provide real-time data as to the geometry, measurements, and/or pose of the target object. By comparing post-deformation images to one another, displacement of the deformable membrane 320 occurring within smaller increments of time can be determined, as opposed to a total deformation of the deformable membrane 320 from an initial, pre-deformed state.

Figure 11:
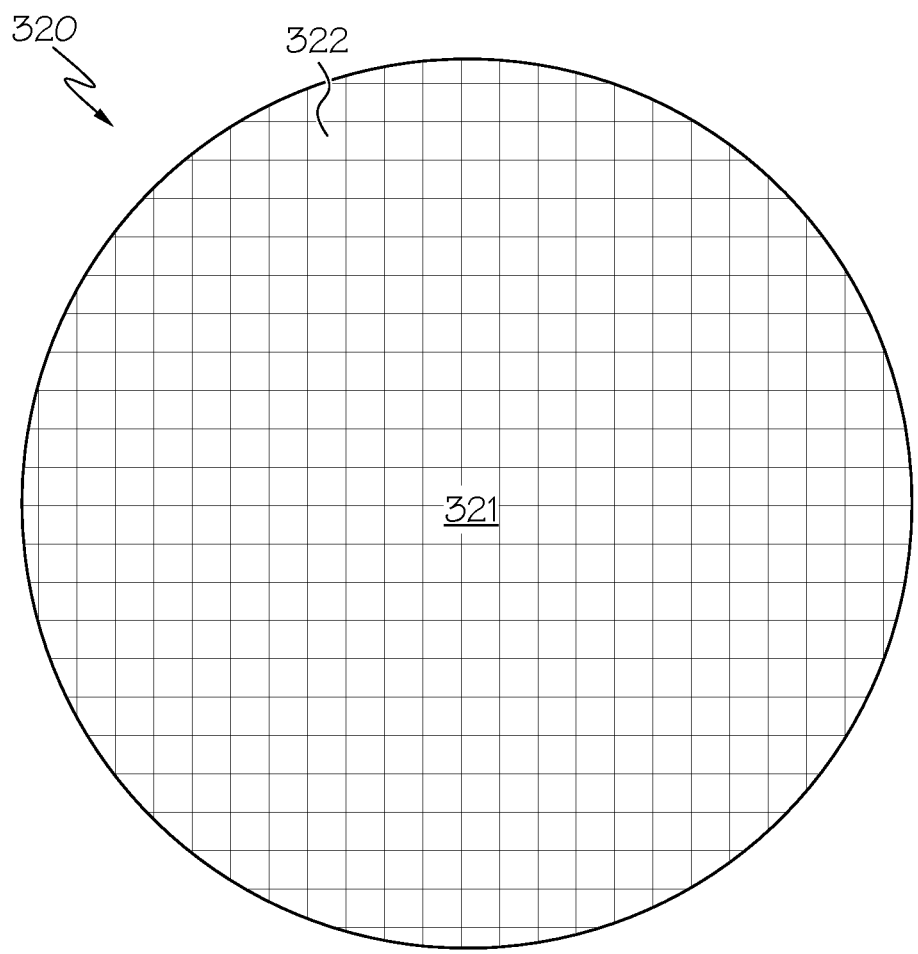
FIG. 11 schematically depicts a grid pattern on a bottom surface of a deformable membrane of a deformable sensor according to one or more embodiments described and illustrated herein.

Referring to FIG. 11, in some embodiments, the pattern may be a grid pattern 322 applied to a bottom surface 321 of the deformable membrane 320 to assist in the detection of the deformation of the deformable membrane 320. For example, the grid pattern 322 may assist in the detection of the deformation when the internal sensor 330 is a stereo-camera. For example, varying degrees of distortion to the grid pattern 322 may be utilized to discern how much deformation has occurred. In this example, the distance between parallel lines and/or measuring curvature of lines in the grid pattern 322 may be used to determine the amount of deformation at each point in the grid pattern 322. The pattern on the bottom surface 321 may be random and not necessarily arranged in a grid pattern 322 or an array as shown in FIG. 11. It should be understood that embodiments are not limited to grid patterns and dot patters as discussed herein, as other types of patterns are possible, such as shapes and the like.

Figure 12:
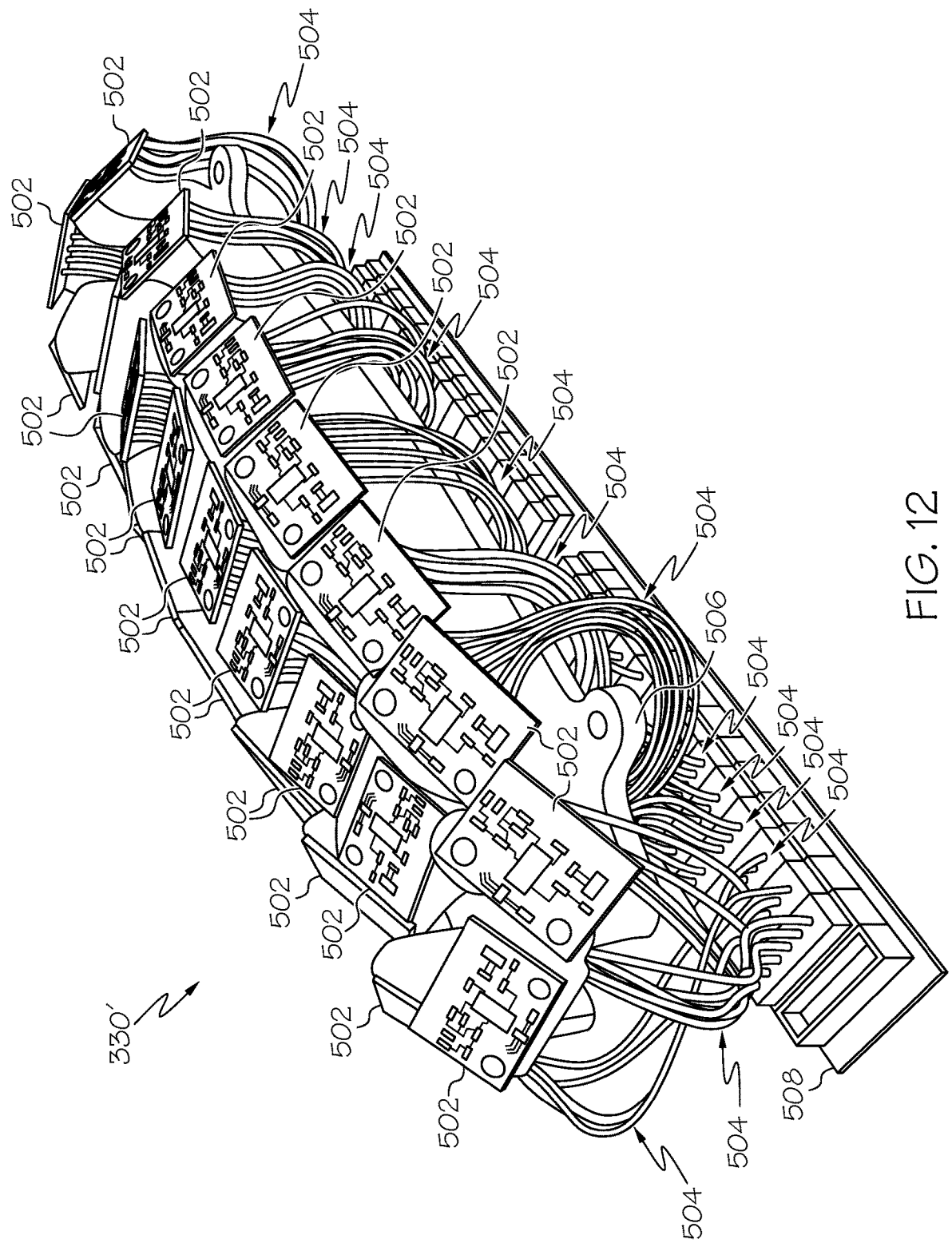
FIG. 12 schematically depicts a compound internal sensor having a plurality of internal sensors according to one or more embodiments described and illustrated herein.

Referring now to FIG. 12, an embodiment depicts a compound internal sensor 330', which may be utilized instead of the internal sensor 330 of the deformable sensor 112 or the internal sensor 430 of the deformable sensor 112'. A plurality of internal sensors 502 are depicted, which in this embodiment are time-of-flight cameras. Other embodiments may utilize any combination of various types of internal sensors. In this embodiment, cables 504 are utilized to provide data communications and/or power to the internal sensors, although other embodiments may use a different number of cables and/or wireless connections for data and/or power. A support structure 506 is depicted in this embodiment, although other embodiments may utilize a plurality of support structures 506 or no support structure. In this embodiment, the support structure 506 is rigid, although one or more support structures 506 may be flexible to change the orientation of internal sensors 502 in some embodiments. In this embodiment, the cables 504 may be connected to a base portion 508 for data communications and/or power.

Figure 13:
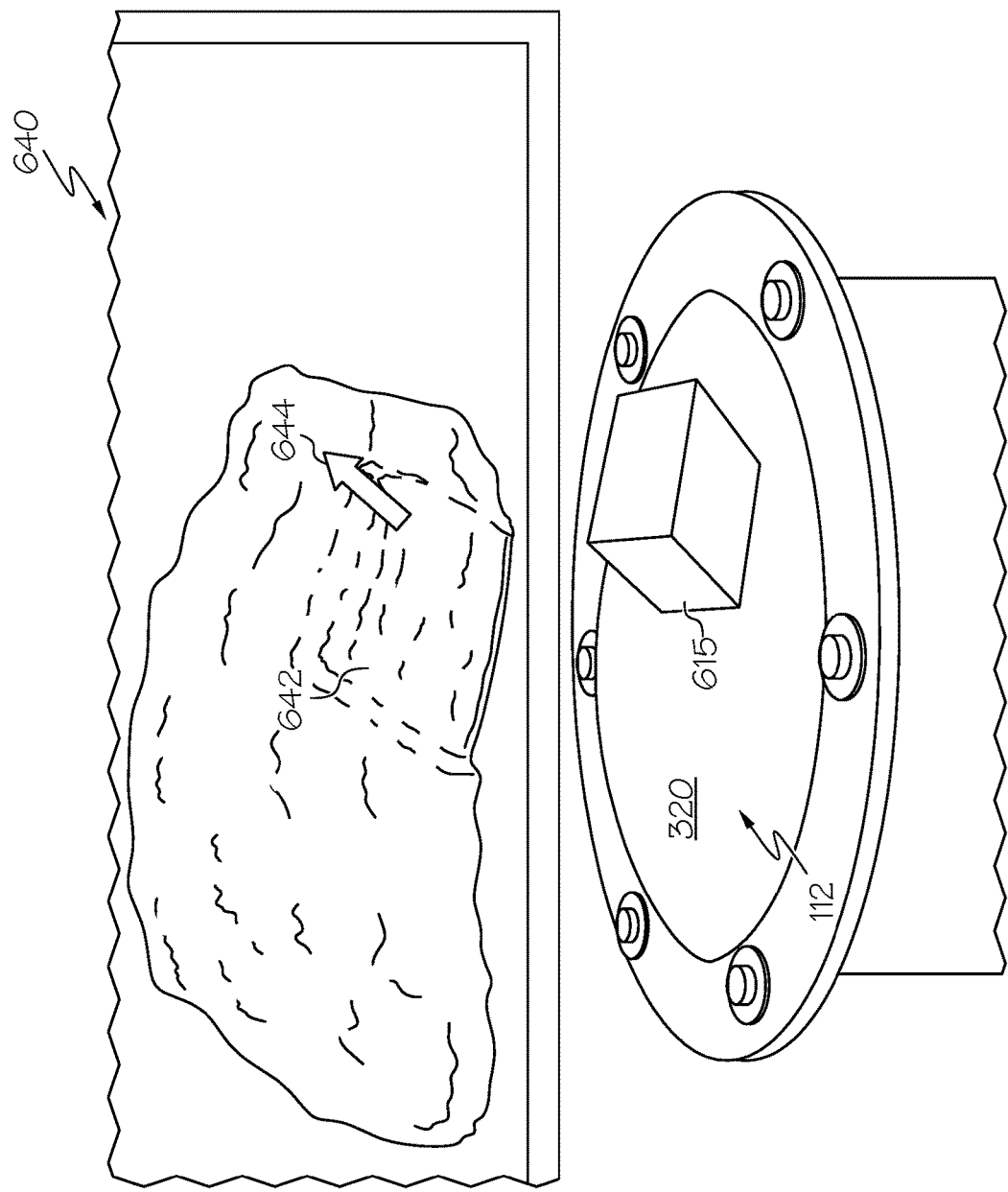
FIG. 13 is an image depicting an output of a deformable sensor on an electronic display according to one or more embodiments described and illustrated herein.

FIG. 13 depicts an image of an example object 615 displacing the deformable membrane 320 of the deformable sensor 112. It should be appreciated, that the deformable sensor 112' may also be used in the same manner as discussed herein. In the illustrated embodiment, a display device 640 outputs for display on a device, output of the deformable sensor 112 in real time as an object 615 contacts and/or deforms the deformable membrane 320. It should be understood that the display device 640 is provided for illustrative purposes only, and that embodiments may be utilized without a display device. As the object 615 is pressed into the deformable membrane 320, the object 615 imparts its shape into the deformable membrane 320 such that the deformable membrane 320 conforms to the shape of the object 615. The spatial resolution of the internal sensor 330 may be such that the internal sensor 330 detects the geometry and/or pose of the displaced deformable membrane 320. For example, when the internal sensor 330 is a time-of-flight sensor, the optical signal that is reflected off of the bottom surface 321 of the deformable membrane 320 that is being deflected by the object has a shorter time-of-flight than the optical signal that is reflected by the deformable membrane 320 at a region outside of the deflected region. Thus, a contact region 642 (or displaced region, used herein interchangeably) having a geometry and/or pose matching the shape of the object 615 may be outputted and displayed on the display device 640.

The deformable sensor 112 therefore may not only detect the presence of contact with the object 615, but also the geometry of the object 615. In this manner, the robot equipped with either the deformable sensor 112 or the deformable sensor 112' may determine the geometry of an object based on contact with the object. Additionally, a geometry and/or pose of the object 615 may also be determined based on the geometric information sensed by the deformable sensors 112, 112'. For example, a vector 644 that is normal to a surface in the contact region 642 may be displayed, such as when determining the pose of the object 615. The vector 644 may be used by a robot or other device to determine which direction a particular object 615 may be oriented, for example.

Figure 14:
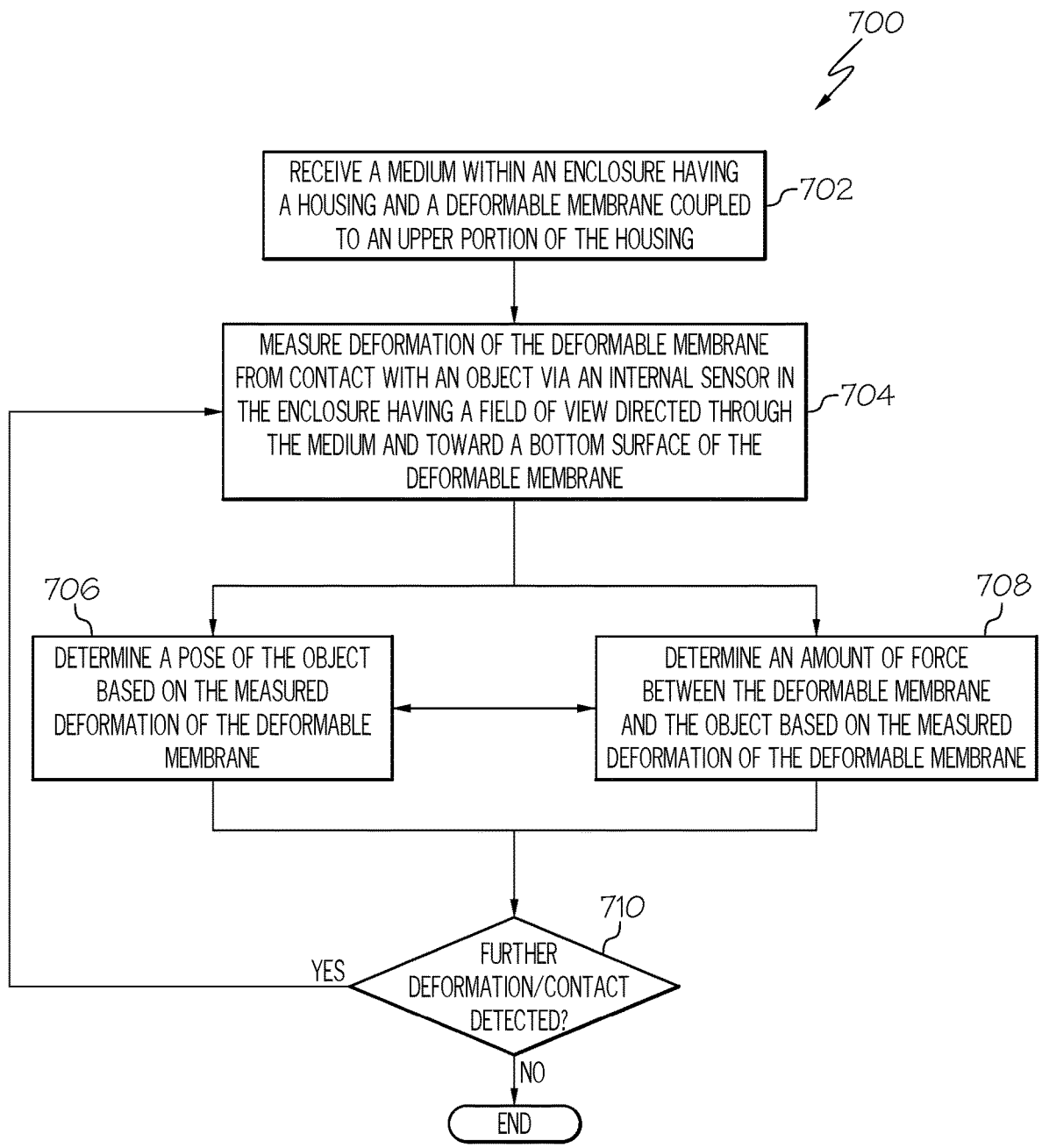
FIG. 14 is a flow chart depicting an exemplary process of determining the pose and force associated with an object in contact with a deformable sensor according to one or more embodiments described and illustrated herein.

Turning now to FIG. 14, a flowchart illustrates an exemplary method 700 for determining the pose and force associated with an object in contact with the deformable sensors 112, 112'. However, as discussed herein, reference is made to FIGS. 3 and 4 illustrating the deformable sensor 112 without limiting the scope of the present disclosure. At block 702, a medium (gas, liquid, silicone, etc.) may be received within the enclosure 313 where the deformable membrane 320 is coupled to an upper portion 311 of the housing 310. At block 704, deformation of the deformable membrane 320 may be measured based on contact with an object 615 via an internal sensor 330 in the enclosure 313 having a field of view 332 directed through the medium and toward a bottom surface 321 of the deformable membrane 320. At block 706, a pose of the object 615 may be determined based on the measure deformation, such as the contact region 642, of the deformable membrane 320. As discussed above with reference to FIG. 13, a pose of the object 615 may be determined by the object 615 being pressed into the deformable membrane 320 and the deformable membrane 320 conforms to the shape of the object 615. Thereafter, the internal sensor 330 detects the geometry and/or pose of the displaced deformable membrane 320. At block 708, an amount of force between the deformable membrane 320 and the object 615 is determined based on the measured deformation of the deformable membrane 320. Blocks 706 and 708 may be performed simultaneously, but do not necessarily need to be. At block 710, a determination is made as to whether further deformation and/or contact is detected. If so, then the flowchart may return to block 704. If not, the flowchart may end.

Figure 15:
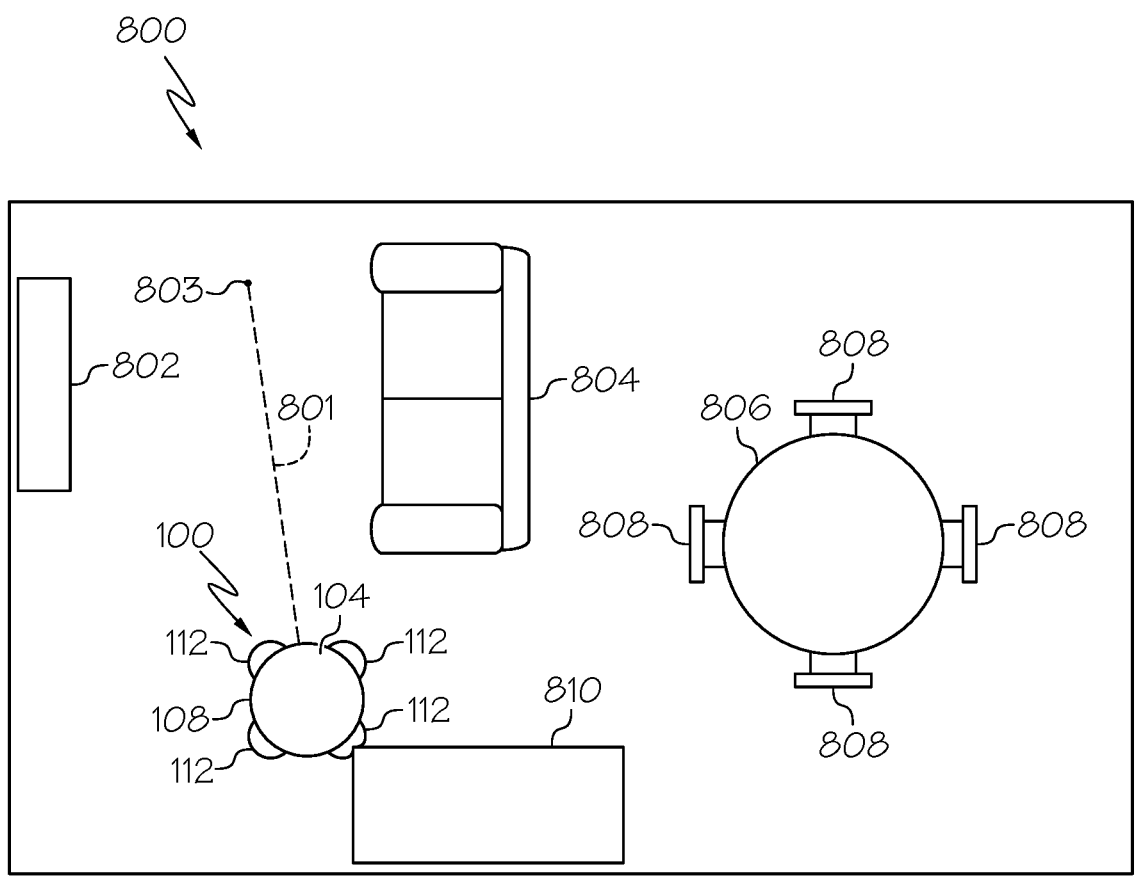
FIG. 15 schematically depicts an overhead view of a space in which the robot is utilized and performs an operation according to one or more embodiments described and illustrated herein.
Figure 16:
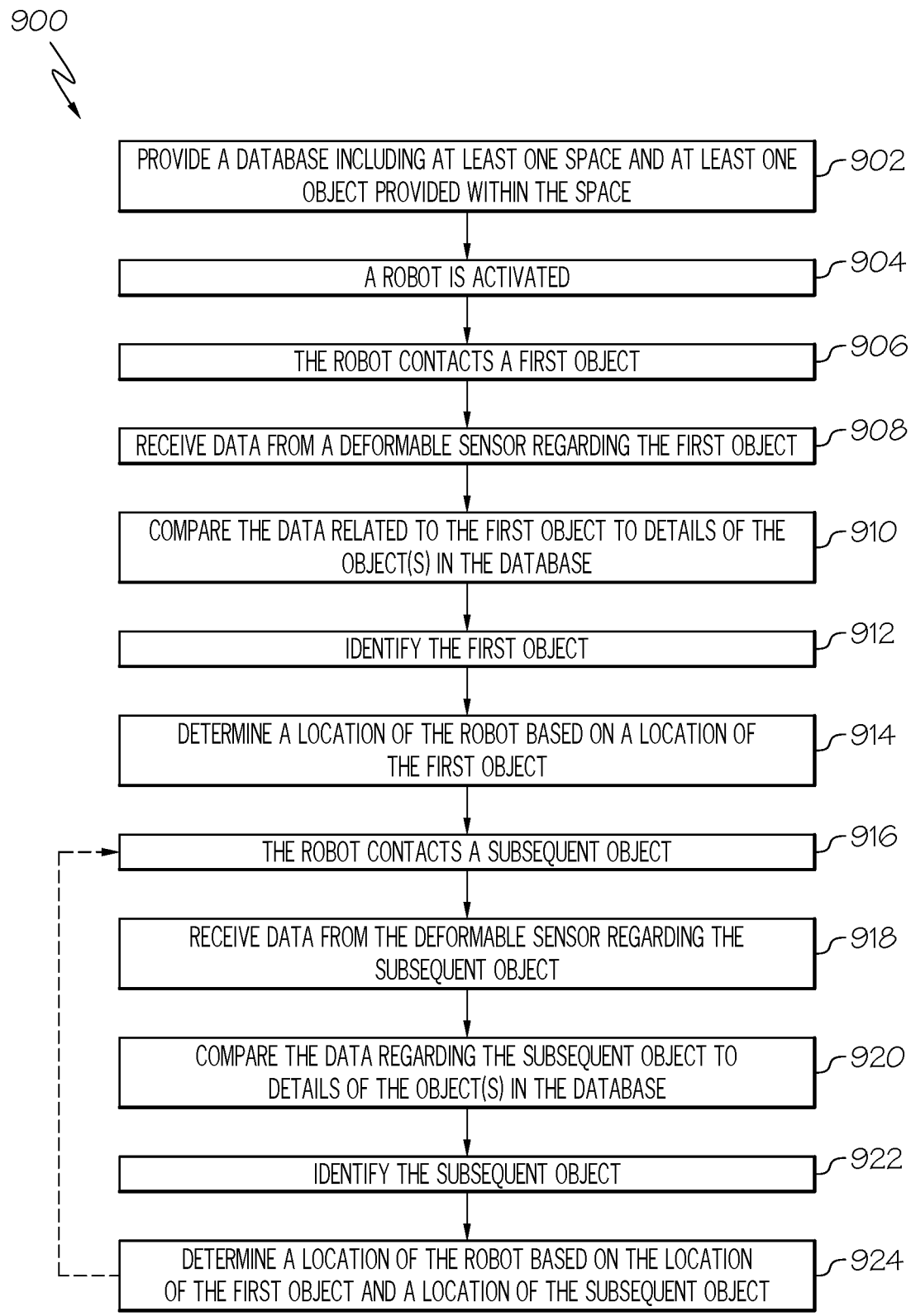
FIG. 16 is a flow chart depicting an exemplary process of determining a location of the robot within a space according to one or more embodiments described and illustrated herein.

Referring now to FIG. 16, a flowchart illustrates an exemplary method 900 of determining a location of the robot 100 within a space is depicted with reference to the robot 100 illustrated in FIGS. 1 and 2 and an example space 800 illustrated in FIG. 15 in which the robot 100 performs an operation. As discussed herein, reference will be made to the robot 100 utilizing the deformable sensor 112. However, the method 900 is equally applicable to the robot 100 including the deformable sensor 112' Initially, at block 902, a database is created. The database includes information of at least one space and information of objects located within the space so that the robot 100 can determine its location within the space. The database may include information of a plurality of different spaces, such as different rooms in a home or facility. Thus, the spaces stored within the database may include specific identifiers to differentiate between the spaces, such as "Bedroom", "Kitchen", "Living Room", etc. For each space, a floorplan may be initially provided prior to an operation of the robot 100 or the floorplan may be mapped in real-time by the robot 100 so that the robot 100 can determine its location within the space. In some embodiments, the floorplan stored in the database includes dimensions of the space, a location of objects on the floor surface of the space that the robot 100 might come into contact with during its operation, dimensions of the objects, and/or clearance distances between objects in the space. Further, the database may include specific information such as the material of construction of an object to associate certain characteristics, such as texture, hardness, flexibility, and/or the like, with the object. For example, if an object, such as a kitchen table, is identified as being made of wood, the database will assign the object a characteristic that the object has a specific hardness associated with wood, or whichever material the object is formed of. Alternatively, if an object, such as a couch, is identified as being made of a fabric or leather, the database will assign the object a characteristic that the object has a hardness associated with a fabric or leather, which may be less than the hardness of the object formed of wood. Other characteristics assigned to the objects can include the object having rounded edges, corners, protrusions, surface features, etc. The database does not need to include each of the information and/or characteristics discussed herein. However, it should be appreciated that the more information and characteristics that are provided in the database with regard to the space and the objects provided therein, the quicker and more efficiently the robot 100 will be able to determine its location within the space.

The information of the space and/or the objects discussed herein may be entered into the database manually, such as by operating the input device 238 or the portable electronic device 280. As such, the information of the space and/or the objects may be modified and/or deleted as necessary when the space and/or the objects are changed, such as when furniture is moved or replaced. The database may be stored in the network 270 or may be stored within the memory module 232 of the robot 100 itself. However, if the database is stored in the network 270, the robot 100 uses a connection to the network 270 during operation to retrieve and utilize the information stored in the database. Alternatively, the robot 100 may be instructed to download the database or one or more portions of the database from the network 270 onto the memory module 232 of the robot 100 prior to performing an operation. After the robot 100 completes the operation, the database may be deleted to make additional storage space available for subsequent downloads of the database or portions thereof.

The deformable sensors 112 may also be utilized to map a space when contacting an object or a wall of the space during an exploratory operation. This allows the robot 100 to automatically map the space during an exploratory operation of the robot 100 and reduces, or in some instances eliminates, the need for manual input by the user of the information of the space and the objects provided therein. However, when mapping the space during an operation in real time, the robot 100 may not be able to determine its location until a sufficient amount of the space has been mapped. In some embodiments, the robot 100 may include supplemental sensing devices in addition to the deformable sensors 112 such as optical sensors, acoustic sensors, time-of-flight cameras, laser scanners, ultrasonic sensors, or the like, for automatically mapping the space and determining information of the objects provided therein.

Referring still to the method 900 illustrated in FIG. 16, with reference to the robot 100 illustrated in FIGS. 1 and 2 positioned within the example space 800 illustrated in FIG. 15 and, such as a family room or a living room in a home, and the robot 100 is activated at block 904 to perform an operation. In the case of the robot 100 being an autonomous vacuum, the operation may be a cleaning operation. In the case in which the robot 100 is an object retrieval robot or an object delivery robot, the operation may be navigating to a destination to retrieve or deliver an object. The example space 800 includes a plurality of objects such as, for example, an entertainment system 802, a couch 804, a table 806, a plurality of chairs 808 arranged around the table 806, and a cabinet 810. As noted above, in some embodiments, information of the space 800 and the objects provided in the space 800 are manually inputted into the database prior to the robot 100 beginning its operation. As such, the database may include information such as the locations and/or dimensions of the space 800, the entertainment system 802, the couch 804, the table 806, the plurality of chairs 808, and the cabinet 810. As also noted above, the database may also include the materials of construction of each of the objects and/or distances between each of the objects.

In an example operation as shown in FIG. 15, the robot 100 moves throughout the space 800 and, at block 906, one of the plurality of deformable sensors 112 extending from the robot 100 contacts a first object, e.g., the cabinet 810, which may be formed of wood. In contacting the cabinet 810, the portion of the deformable sensor 112 contacting the cabinet 810 deforms. For purposes of the present example operation, the first object is referred to as the cabinet 810. However, the first object may be any other object within the space 800 based on an initial starting point and travel direction of the robot 100. As discussed in more detail below with regard to the deformable sensor 112, the deformable sensor 112 provides data at block 908 including at least a geometry, pose, hardness, and/or flexibility of the cabinet 810. Thus, based on the specific deformation of the deformable sensor 112 in the illustrated example shown in FIG. 15, the robot 100 identifies that the cabinet 810 has a specific hardness. In addition, the robot 100 may also recognize that the deformable sensor 112 is contacting an edge or corner of the cabinet 810 based on the specific deformation of the deformable sensor 112.

In some embodiments, the robot 100, such as the edge surface 108 of the robot 100, may contact an object at a point between adjacent deformable sensors 112 such that none of the deformable sensors 112 deform against an object. In this case, the robot 100 may turn or rotate to reposition itself so that one of the deformable sensors 112 contact the object and deforms. In some embodiments, the robot 100 includes additional, smaller deformable sensors provided along the edge surface 108 of the robot 100 between adjacent deformable sensors 112 to determine where the robot 100 contacted the object and how to reposition the robot 100 so that one of the deformable sensors 112 contacts the object.

In embodiments in which the database has been populated with information of the space 800 and the objects provided therein prior to the operation, the robot 100 compares, at block 910, the acquired information or data of the first object, e.g., the cabinet 810, which is determined by the deformable sensor 112, to the information associated with each of the objects in the space 800 stored in the database. In doing so, the robot 100 is able to identify at block 912, or at least narrow the possible options, the first object in the space 800 which the robot 100 contacted. For example, the robot 100 can rule out the object contacted as being the couch 804 made from a fabric or leather as the associated hardness of the couch 804 identified in the database is less than the associated hardness of the cabinet 810 formed of wood. This allows the robot 100 to determine at block 914, or at least narrow, the location of the robot 100 within the space 800 based on which possible objects in the space 800 the robot 100 may have contacted.

When the database includes a plurality of spaces, the robot 100 may compare the first object contacted to each object within each one of the spaces in the database. However, in some embodiments, the robot 100 may compare the first object to only those objects in a specific space or subset of spaces based on instruction from a user indicating which space the robot 100 begins its operation. Alternatively, the location sensor 250 of the robot 100 may be utilized to determine a general location of the robot 100. This may assist in narrowing the number of possible spaces in which the robot 100 is operating.

To identify the first object as a first identified object of one of the plurality of objects in the database and, thus, the location of the robot 100, the robot 100 may also take into consideration a clearance distance around the object and a direction traveled by the robot 100 prior to contacting the first object. As shown in FIG. 15, the robot 100 moves in a straight line along a distance 801 from a starting point 803 prior to contacting the cabinet 810. Based on this information and the information associated with the space 800 provided in the database, the robot 100 may be able to rule out possible objects, such as the table 806 and the chairs 808, which do not provide enough clearance to travel the distance 801.

Once the robot 100 identifies that the first object contacted is the cabinet 810, the robot 100 can determine its location within the space 800 at block 914 based on the known location of the cabinet 810 in the space 800 stored in the database. However, if the robot 100 is not capable of correctly identifying the first object based on the limited amount of information acquired by the deformable sensor 112, the robot 100 continues its operation until a subsequent object is contacted to confirm the identity of the first object and the location of the robot 100 from a number of possible locations within the space 800. For example, after contacting the first object, e.g., the cabinet 810, the robot 100 will turn away from the first object and travel in a different direction to continue the operation. The robot 100 will then eventually contact a subsequent object at block 916, such as the couch 804, and receives a subsequent signal based on contact with the subsequent object. At block 918, while contacting the subsequent object, e.g., the couch 804, the deformable sensor 112 identifies the shape and hardness of the second object in a manner similar to that which is described herein with respect to the first object at blocks 908-912. At block 920, this information is compared to the information provided in the database and at block 922, the subsequent object is identified as a subsequent identified object of one of the plurality of objects in the database, or at least the possibilities of the identity of the first object and the subsequent object is narrowed. As noted herein, the robot 100 may also take into consideration a distance traveled from a point at which the robot 100 contacted the first object to a point at which the robot 100 contacted the subsequent object to assist in correctly identifying the first object and the subsequent object.

At block 924, once the identification of the first object is confirmed, and in some instances the subsequent object if necessary, the robot 100 is able to determine its location within the space 800. As such, the robot 100 may continue its operation and avoid further contact with any other objects within the space 800 based on location information of other objects in the space 800 provided in the database. This is useful in instances in which the robot 100 needs to travel to a specific location in the space 800, such as to perform a cleaning operation or an object retrieval/delivery operation. The location of the robot 100 may also be stored within the memory module 232 so that the robot 100 may continue to track its location within the space 800 during future operations. Thus, contact with additional or subsequent objects may not be necessary. Alternatively, the robot 100 may repeat blocks 916-924 with regard to a further subsequent object if the location of the robot 100 is not accurately determined.

It should now be understood that embodiments of the present disclosure are directed deformable sensors capable of detecting contact with an object as well as a geometric shape and pose of an object. One or more deformable sensors may be provided on a robot, for example. The information provided by the deformable sensors may then be used to control the robot's interaction with target objects. The depth resolution and spatial resolution of the deformation sensors may vary depending on the location of the deformable sensors on the robot.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for determining a location of a robot including a deformable sensor, the method comprising:

receiving, by a processor, a signal from the deformable sensor comprising data with respect to a deformation region in a deformable membrane of the deformable sensor resulting from contact with a first object;

comparing, by the processor, the data associated with contact with the first object to information associated with a plurality of objects stored in a database;

identifying, by the processor, the first object as a first identified object of the plurality of objects stored in the database, the first identified object is an object of the plurality of objects stored in the database that is most similar to the first object;

determining, by the processor, a location of the robot based on a location of the first identified object.

2. The method of claim 1, further comprising:
determining, by the processor, a distance traveled to the first object;
identifying a clearance distance within the information of the plurality of objects stored in the database; and
comparing the distance traveled by the robot to the first object to the clearance distance of the plurality of objects.

3. The method of claim 1, further comprising receiving, by the processor, a subsequent signal from the deformable sensor comprising data with respect to the deformation region in the deformable membrane resulting from contact with a subsequent object.

4. The method of claim 3, further comprising comparing, by the processor, the data associated with contact of the subsequent object to information associated with the plurality of objects stored in the database, the information including at least one of a geometry, a pose, a hardness, a flexibility, and a location of the plurality of objects.

5. The method of claim 4, further comprising:
identifying, by the processor, the subsequent object as a subsequent identified object of the plurality of objects stored in the database,
wherein the location of the robot is based on the location of the first identified object and a location of the subsequent identified object.

6. The method of claim 1, further comprising, when the robot contacts the first object and the deformable sensor does not contact the first object, repositioning the robot, by the processor, so that the deformable sensor contacts the first object.

7. The method of claim 1, further comprising modifying deformability of the deformable sensor by changing a pressure within an enclosure defined in part by the deformable membrane.

8. The method of claim 1, further comprising:
utilizing an internal sensor disposed within the deformable sensor and having a field of view directed through a medium stored within an enclosure of the deformable sensor and toward a bottom surface of the deformable membrane; and
scattering an optical signal emitted by the internal sensor by a filter layer disposed on the bottom surface of the deformable membrane.

9. The method of claim 8, further comprising analyzing, by the processor, the deformation region by measuring changes to a coating or a pattern on the bottom surface of the deformable membrane.

10. The method of claim 8, wherein the internal sensor comprises a time-of-flight sensor.

11. A robot for determining a location within a space, the robot comprising:

a casing including an upper surface, an opposite lower surface, and an edge surface extending between the upper surface and the lower surface;
at least one deformable sensor provided on the casing, the deformable sensor comprising an internal sensor and a deformable membrane, the internal sensor configured to output a deformation region within the deformable membrane as a result of contact with a first object;
one or more processors; and
one or more memory modules comprising non-transitory computer-readable medium storing computer-readable instructions that, when executed by the one or more processors, cause the one or more processors to:
receive data from the internal sensor representing the deformation region of the deformable membrane when the first object is contacted;
compare the data associated with contact of the first object to information associated with a plurality of objects stored in a database;
identify the first object as a first identified object of the plurality of objects stored in the database, the first identified object is an object of the plurality of objects stored in the database that is most similar to the first object; and
determine a location of the robot based on a location of the first identified object.

12. The robot of claim 11, wherein the one or more memory modules includes non-transitory computer-readable medium storing computer-readable instructions that, when executed by the one or more processors, cause the one or more processors to:
determine, by the processor, a distance traveled to the first object;
identify a clearance distance within the information of the plurality of objects stored in the database; and
compare the distance traveled by the robot to the first object to the clearance distance of the plurality of objects.

13. The robot of claim 11, wherein the one or more memory modules includes non-transitory computer-readable medium storing computer-readable instructions that, when executed by the one or more processors, cause the one or more processors to:
receive, by the processor, a subsequent signal from the deformable sensor comprising data with respect to the deformation region in the deformable membrane resulting from contact with a subsequent object.

14. The robot of claim 13, wherein the one or more memory modules includes non-transitory computer-readable medium storing computer-readable instructions that, when executed by the one or more processors, cause the one or more processors to:
compare, by the processor, the data associated with contact of the subsequent object to information associated with the plurality of objects stored in the database, the information including at least one of a geometry, a pose, a hardness, a flexibility, and a location of the plurality of objects.

15. The robot of claim 14, wherein the one or more memory modules includes non-transitory computer-readable medium storing computer-readable instructions that, when executed by the one or more processors, cause the one or more processors to:
identify, by the processor, the subsequent object as a subsequent identified object of the plurality of objects stored in the database, wherein the location of the robot is based on the location of the first identified object and a location of the subsequent identified object.

16. A system for determining a location of a robot including a deformable sensor, the system comprising:
a robot including an upper surface, an opposite lower surface, and an edge surface extending between the upper surface and the lower surface;
at least one deformable sensor provided on the robot, the at least one deformable sensor comprising a housing, a deformable membrane coupled to an upper portion of the housing, an enclosure configured to be filled with a medium, and an internal sensor disposed within the housing and having a field of view configured to be directed through the medium and toward a bottom surface of the deformable membrane, wherein the internal sensor is configured to output a deformation region within the deformable membrane as a result of contact with a first object;
one or more processors; and
one or more memory modules comprising non-transitory computer-readable medium storing computer-readable instructions that, when executed by the one or more processors, cause the one or more processors to:
receive data from the internal sensor representing the deformation region when the first object is contacted;
compare the data associated with contact of the first object to information associated with a plurality of objects stored in a database;
identify the first object as a first identified object of the plurality of objects stored in the database, the first identified object is an object of the plurality of objects stored in the database that is most similar to the first object; and
determine a location of the robot based on a location of the first identified object.

17. The system of claim 16, wherein the one or more memory modules includes non-transitory computer-readable medium storing computer-readable instructions that, when executed by the one or more processors, cause the one or more processors to:
determine a distance traveled to the first object, the information of the plurality of objects stored in the database including a clearance distance; and
compare the distance traveled by the robot to the first object to the clearance distance of the plurality of objects.

18. The system of claim 16, wherein the one or more memory modules includes non-transitory computer-readable medium storing computer-readable instructions that, when executed by the one or more processors, cause the one or more processors to:
receive a signal from the deformable sensor comprising data with respect to a deformation region in a deformable membrane resulting from contact with a subsequent object.

19. The system of claim 18, wherein the one or more memory modules includes non-transitory computer-readable medium storing computer-readable instructions that, when executed by the one or more processors, cause the one or more processors to:
compare the data associated with contact of the subsequent object to information associated with the plurality of objects stored in the database, the information including at least one of a geometry, a pose, a hardness, a flexibility, and a location of the plurality of objects.

20. The system of claim 19, wherein the one or more memory modules includes non-transitory computer-readable medium storing computer-readable instructions that, when executed by the one or more processors, cause the one or more processors to:
identify the subsequent object as a subsequent identified object of the plurality of objects stored in the database, and wherein the location of the robot is based on the location of the first identified object and a location of the subsequent identified object.

* * * * *

UNITED STATES PATENT AND TRADEMARK OFFICE
CERTIFICATE OF CORRECTION

PATENT NO. : 11,577,395 B2
APPLICATION NO. : 16/931626
DATED : February 14, 2023
INVENTOR(S) : Alexander Alspach et al.

It is certified that error appears in the above-identified patent and that said Letters Patent is hereby corrected as shown below:

On the Title Page

Item (71), applicant 2, city, delete "Toyota", and insert --Toyota-shi, Aichi-ken--, therefor.

Item (72), inventor 8, city, delete "Nagakute", and insert --Nagakute-shi, Aichi-ken--, therefor.

Item (73), assignee 2, city, delete "Toyota", and insert --Toyota-shi, Aichi-ken--, therefor.

Signed and Sealed this
Sixteenth Day of May, 2023

Katherine Kelly Vidal
*Director of the United States Patent and Trademark Office*